(12) United States Patent
Fukunaga et al.

(10) Patent No.: US 7,703,840 B2
(45) Date of Patent: Apr. 27, 2010

(54) VEHICLE WITH CABIN

(75) Inventors: Tomofumi Fukunaga, Sakai (JP);
Yutaka Kitano, Kawachinagano (JP);
Kenichi Aoyama, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/051,812

(22) Filed: Mar. 19, 2008

(65) Prior Publication Data

US 2008/0252102 A1 Oct. 16, 2008

(30) Foreign Application Priority Data

Apr. 12, 2007 (JP) ............................. 2007-104966
Apr. 16, 2007 (JP) ............................. 2007-107189

(51) Int. Cl.
*B60J 7/00* (2006.01)
(52) U.S. Cl. .............................. 296/190.07; 296/35.1
(58) Field of Classification Search ............ 296/190.07, 296/190.01, 1.01, 35.1, 190.08, 1.03; 180/89.1; 267/136; 248/636
See application file for complete search history.

(56) References Cited

U.S. PATENT DOCUMENTS

| | | | | | |
|---|---|---|---|---|---|
| 4,012,071 | A | * | 3/1977 | Jones et al. | 296/35.1 |
| 4,040,499 | A | * | 8/1977 | Kestian et al. | 180/333 |
| 4,059,304 | A | * | 11/1977 | Yamanaka | 296/35.2 |
| 4,135,757 | A | * | 1/1979 | Smith et al. | 296/35.1 |
| 4,203,499 | A | * | 5/1980 | Miyata | 180/89.12 |
| 4,460,168 | A | * | 7/1984 | Obadal | 267/140.11 |
| 4,921,203 | A | * | 5/1990 | Peterson et al. | 248/635 |
| 5,775,666 | A | * | 7/1998 | Tsukamoto et al. | 267/140.13 |
| 5,845,895 | A | * | 12/1998 | Nakada et al. | 267/140.13 |
| 5,873,581 | A | * | 2/1999 | Yale | 280/5.514 |
| 6,017,073 | A | * | 1/2000 | Lindblom et al. | 296/35.1 |
| 6,030,017 | A | * | 2/2000 | Stojkovic et al. | 296/35.1 |
| 6,062,763 | A | * | 5/2000 | Sirois et al. | 403/329 |
| 6,478,102 | B1 | * | 11/2002 | Puterbaugh et al. | 180/89.12 |
| 6,898,501 | B2 | * | 5/2005 | Schubert | 701/50 |
| 7,232,118 | B2 | * | 6/2007 | Maeno et al. | 267/140.3 |
| 7,300,100 | B2 | * | 11/2007 | McLean et al. | 296/190.07 |
| 7,399,020 | B2 | * | 7/2008 | Aoyama et al. | 296/39.3 |
| 2002/0153183 | A1 | * | 10/2002 | Puterbaugh et al. | 180/89.13 |
| 2006/0096269 | A1 | * | 5/2006 | McLean et al. | 56/228 |
| 2007/0096491 | A1 | | 5/2007 | Sato | |
| 2007/0278826 | A1 | | 12/2007 | Sato | |
| 2008/0079281 | A1 | * | 4/2008 | Aoyama et al. | 296/39.3 |
| 2008/0136207 | A1 | * | 6/2008 | Aoyama et al. | 296/35.1 |
| 2008/0296816 | A1 | * | 12/2008 | Tanaka et al. | 267/122 |

FOREIGN PATENT DOCUMENTS

| | | |
|---|---|---|
| CN | 1802276 A | 7/2006 |
| JP | 08142776 | 6/1996 |
| JP | 2001163267 | 6/2001 |
| JP | 2002356184 | 12/2002 |

* cited by examiner

*Primary Examiner*—Kiran B. Patel
(74) *Attorney, Agent, or Firm*—The Webb Law Firm

(57) ABSTRACT

A vehicle with a cabin comprises a vehicle body supported by a plurality of wheels; a cabin bracket supported by the vehicle body; an elastic member for supporting the cabin, disposed between the cabin and the cabin bracket; and a weight member attached to a plate-shaped member of the cabin.

4 Claims, 25 Drawing Sheets

FIG.10
(A)
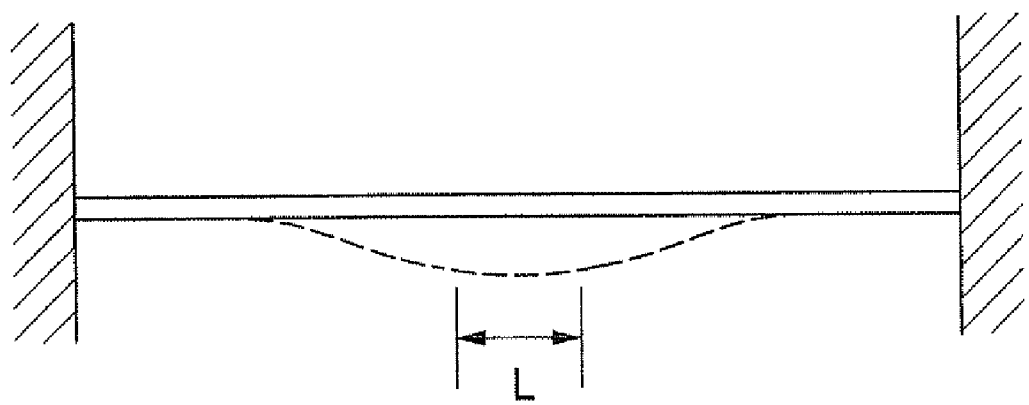
(B)
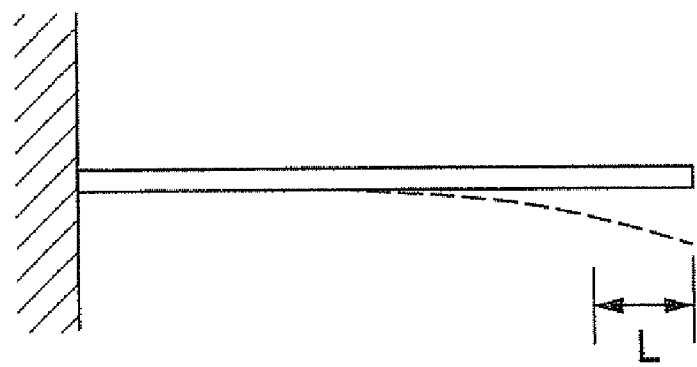

FIG.17

| Attachment Position | Spectrum Values | | OA Values |
|---|---|---|---|
| Front Panel | 200Hz | 6.7dBA | 0.5dBA |
| Rear Fender | 125Hz | 10dBA | 0.6dBA |
| | 200Hz | 2.0dBA | |
| Support Bracket | 400Hz | 4.4dBA | 0.4dBA |

| Attachment Position | Spectrum Values above 800Hz | OA Values |
|---|---|---|
| Center Pillar | 0.5dBA | 0.5dBA |
| Inner-roof | 0.2dBA | 0.2dBA |
| Center Pillar and Inner-roof | 0.7dBA | 0.7dBA |
| (Floor Panel) | 0.3dBA | 0.3dBA |

VEHICLE WITH CABIN

BACKGROUND OF THE INVENTION

1. Field of the Invention

The present invention relates to a vehicle with a cabin, in which the cabin is supported by a vehicle body.

2. Description of the Related Art

As disclosed in JP 2002-356184, for example, a vehicle with a cabin is known as a conventional technique in which an acoustic absorbent sheet is provided to the floor, the ceiling wall, and other parts of the steering unit of the cabin so as to reduce noise inside the cabin.

In the vehicle with a cabin disclosed in the above reference, a configuration is adopted in which the in-cabin noise is transmitted to an acoustic absorbent material via a plurality of holes formed in the surface of the acoustic absorbent sheet, and noise inside the cabin is reduced through the sound-absorbing effects of the acoustic absorbent material. However, the noise inside the cabin is not reduced by reducing vibration transmitted from the vehicle body to the floor surface, ceiling walls, and other parts of the steering unit. As a result, even when the acoustic absorbent sheet is provided to the floor, ceiling walls, and other parts of the steering unit, not only are the noise-reducing effects minimal for the surface area in which the acoustic absorbent sheet is affixed or provided, but noise inside the cabin cannot be adequately reduced, and noise caused by vibration that is transmitted from the vehicle body to the floor, ceiling walls, and other parts of the steering unit contributes significantly to in-cabin noise, which continues to cause discomfort to the operator.

In the vehicle with a cabin disclosed in the abovementioned reference, a configuration is adopted in which noise inside the cabin is reduced by affixing or providing an acoustic absorbent sheet having a wide surface area over a wide range that includes the floor, ceiling walls, and other parts of the steering unit. As a result, drawbacks occur in that the cost of the acoustic absorbent sheet increases; the manufacturing cost of the vehicle markedly increases; a large amount of time is required to affix or provide the acoustic absorbent sheet to the floor, ceiling walls, and other parts of the steering unit; and the productivity of assembling the vehicle is adversely affected.

Therefore, a reinforcing member, a steel plate for suppressing vibration, or the like may be attached to the floor, ceiling walls, and other parts of the steering unit to reduce vibrations transmitted from the vehicle body to the floor, ceiling walls, and other parts of the steering unit, and to reduce the in-cabin noise that is uncomfortable to the operator. However, when a reinforcing member, a steel plate for suppressing vibration, or the like is attached to the floor, ceiling walls, and other parts of the steering unit, drawbacks occur in that the manufacturing cost of the vehicle markedly increases, and the weight of the vehicle increases in conjunction with attaching the reinforcing member, the steel plate for suppressing vibration, or the like.

As disclosed in JP 8-142776, a soundproofing structure for a vehicle is known as another conventional technique in which an acoustic absorbent material is provided between an inner lining material and a door body so that noise inside the cabin can be reduced by the door.

In the vehicle soundproofing structure according to JP 8-142776, a configuration is adopted in which the acoustic absorbent material is housed inside the inner lining material, noise that penetrates into the door body from the joint or the like between the inner lining material and the door body is transmitted to the acoustic absorbent material, and the noise inside the cabin can be reduced, but the in-cabin noise is absorbed by the inner lining material, and is less likely to be transmitted to the acoustic absorbent material. As a result, the noise that occurs inside the cabin is less likely to be absorbed by the acoustic absorbent material, and there is room for improvements to be made to reduce the noise inside the cabin.

SUMMARY OF THE INVENTION

An object of the present invention is to overcome at least one of the drawbacks of the prior art as described above.

The vehicle with a cabin according to the present invention comprises a vehicle body supported by a plurality of wheels; a cabin bracket supported by the vehicle body; an elastic member for supporting the cabin, disposed between the cabin and the cabin bracket; and a weight member attached to a plate-shaped member of the cabin.

Through such a configuration, when noise from the vehicle body is transmitted to the cabin via the elastic member, the relatively non-rigid plate-shaped member is vibrated by the vibration from the vehicle body, and the vibration transmitted to the plate-shaped member can be reduced by the weight effects of the weight member that is attached to the plate-shaped member. As a result, in-cabin noise caused by the vibration transmitted from the vehicle body to the plate-shaped member can be reduced, and the in-cabin noise can be efficiently reduced.

In one aspect of the present invention, the plate-shaped member is preferably one of a rear wheel fender and a floor panel of the cabin.

In one aspect of the present invention, the weight member is preferably attached to the plate-shaped member by a bolt via a rubber isolator.

In one aspect of the present invention, a cylindrical member that is in contact with the plate-shaped member is preferably provided between the weight member and the bolt.

In one aspect of the present invention, the weight member is preferably provided such that attachment of the weight member moves a peak of a vibration acceleration as a function of frequency in a direction of low frequency.

The vehicle with a cabin according to the present invention comprises: a vehicle body that is supported by a plurality of wheels and that supports the cabin; an openings portion in which a plurality of openings is formed and which is provided to a portion of an inside surface of the cabin; and an acoustic absorbent material disposed on an inner surface of the inside surface provided with the openings portion.

Through such a configuration, noise inside the cabin is transmitted to the acoustic absorbent material disposed toward the inner surface of the inside surface through the plurality of openings formed in the openings portion, and the noise is absorbed by the sound-absorbing effects of the acoustic absorbent material. As a result, the in-cabin noise is easily transmitted to the acoustic absorbent material from the plurality of openings formed in the openings portion, the in-cabin noise is easily absorbed by the acoustic absorbent material, and the in-cabin noise can be efficiently reduced.

In one aspect of the present invention, the openings portion is preferably formed in a pillar of a cabin frame that constitutes the cabin.

The openings portion provided with the acoustic absorbent material can thereby be placed in a high position inside the cabin, and the acoustic absorbent material can be disposed at a height that is near the ears of the operator seated in the operating seat. As a result, noise at a height near the ears of the operator seated in the operating seat can be efficiently absorbed by the acoustic absorbent material.

In one aspect of the present invention, the openings portion is preferably formed at a rear part of an inner roof of the cabin.

In one aspect of the present invention, each of the plurality of openings preferably has a diameter of 5 mm or less, and vertically adjacent openings are preferably arranged horizontally staggered from each other.

In one aspect of the present invention, the openings portion is preferably formed in the pillar provided to a side of an operating seat provided inside the cabin.

BRIEF DESCRIPTION OF THE DRAWINGS

FIG. 10 is a rough view in which a floor panel or the like is modeled;

FIG. 17 is a table comparing the results of measuring the noise for each attachment position;

DESCRIPTION OF THE PREFERRED EMBODIMENTS

Multiple embodiments will be described in the present specification. Combinations of the characteristics of one embodiment with the characteristics of another embodiment are encompassed by the scope of the present invention.

Embodiment 1

An embodiment relating to the dynamic damper will first be described.

[Overall Structure of the Tractor]

Figure 1:
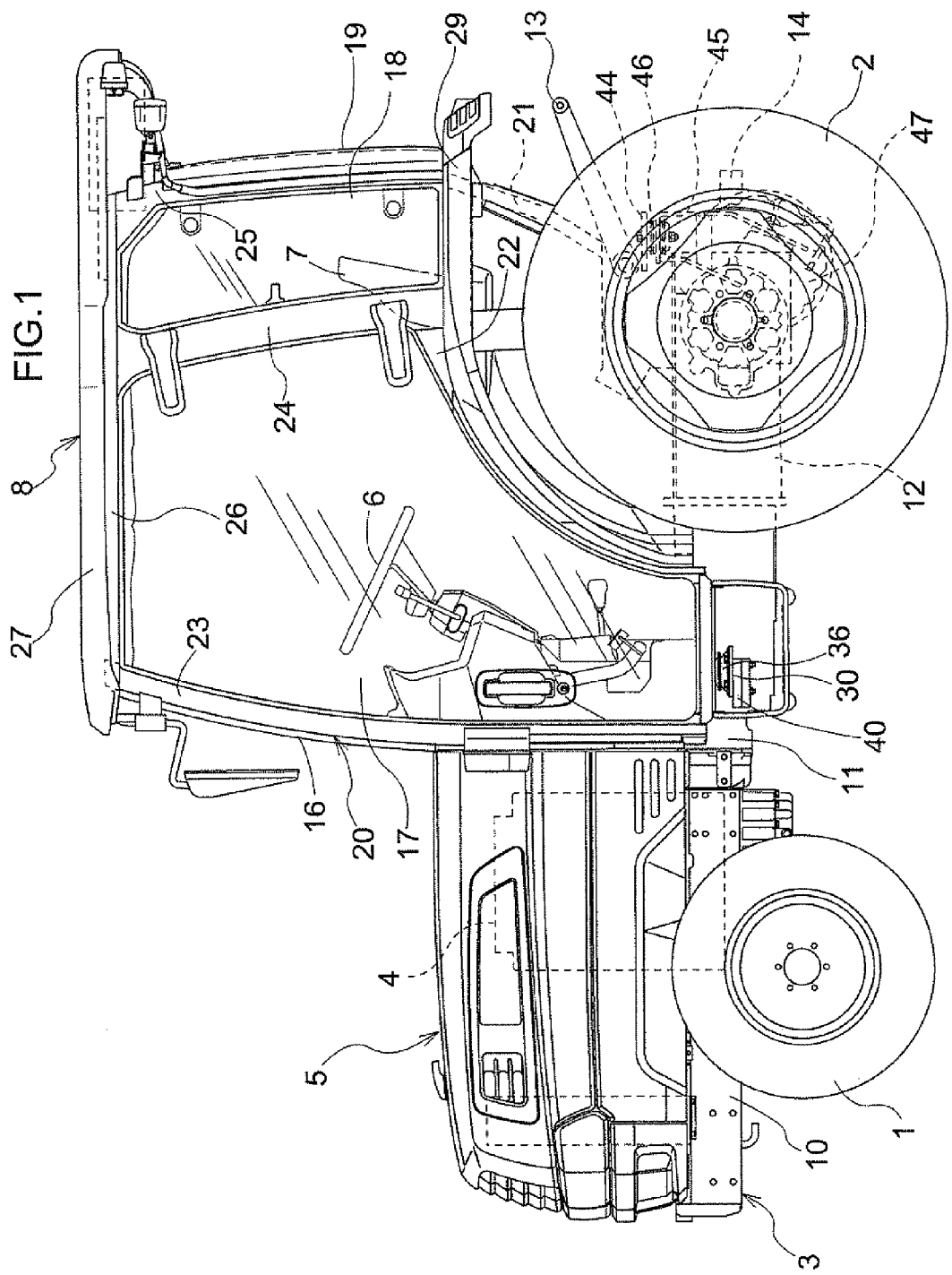
FIG. 1 is a left side view showing the entire tractor.
Figure 2:
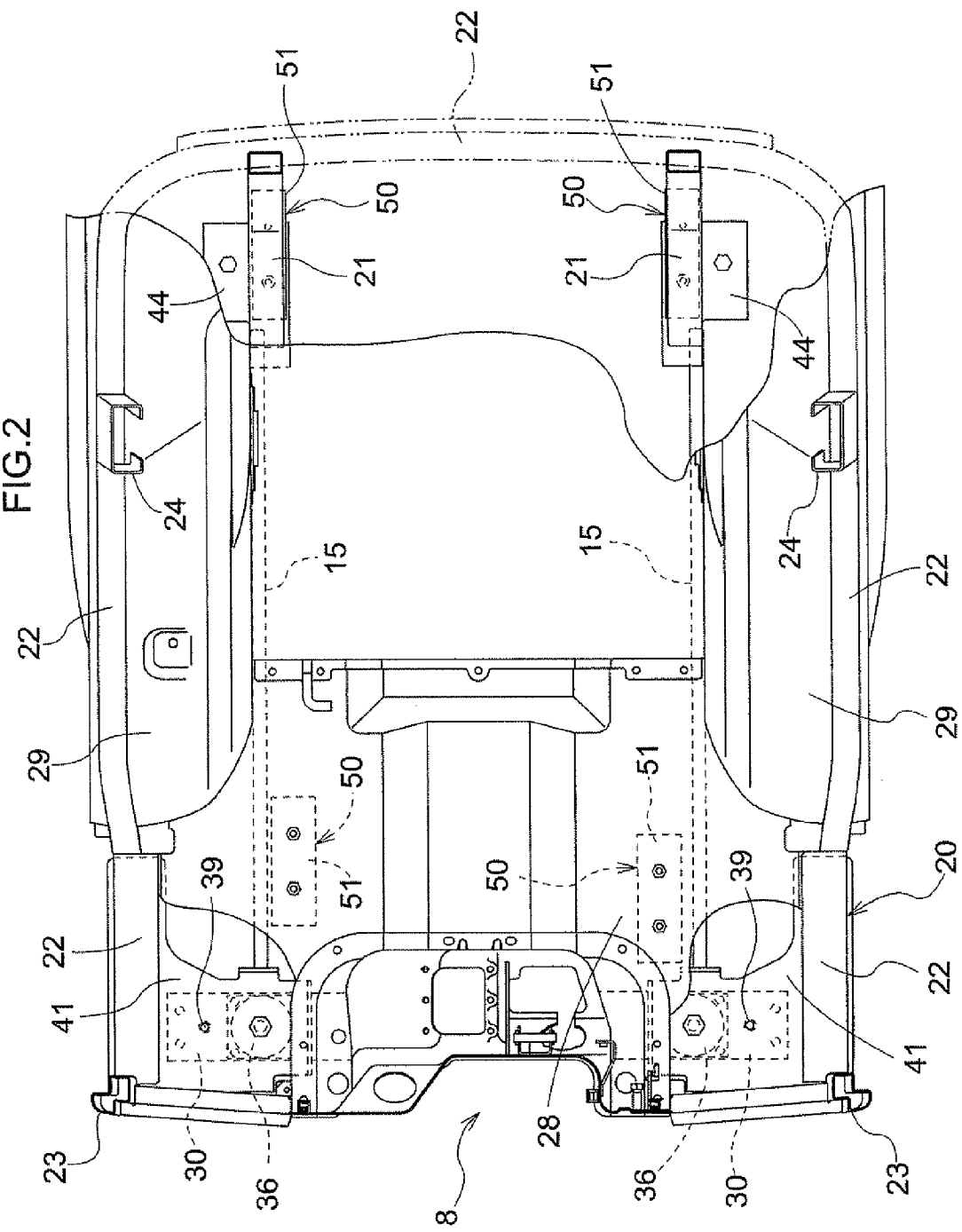
FIG. 2 is a transverse sectional plan view showing the structure of the cabin.
Figure 3:
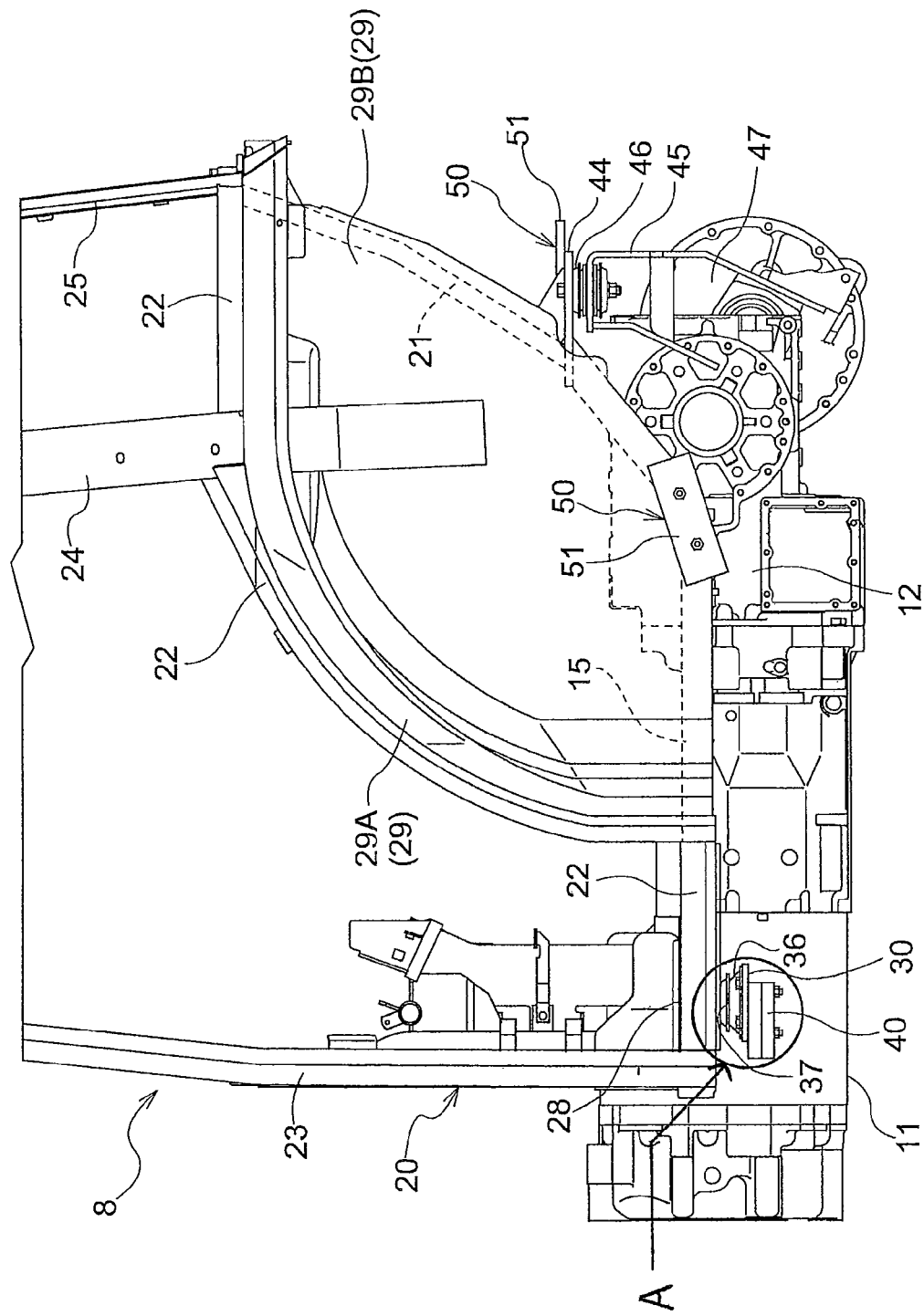
FIG. 3 is a left side view showing the structure of the cabin.
Figure 4:
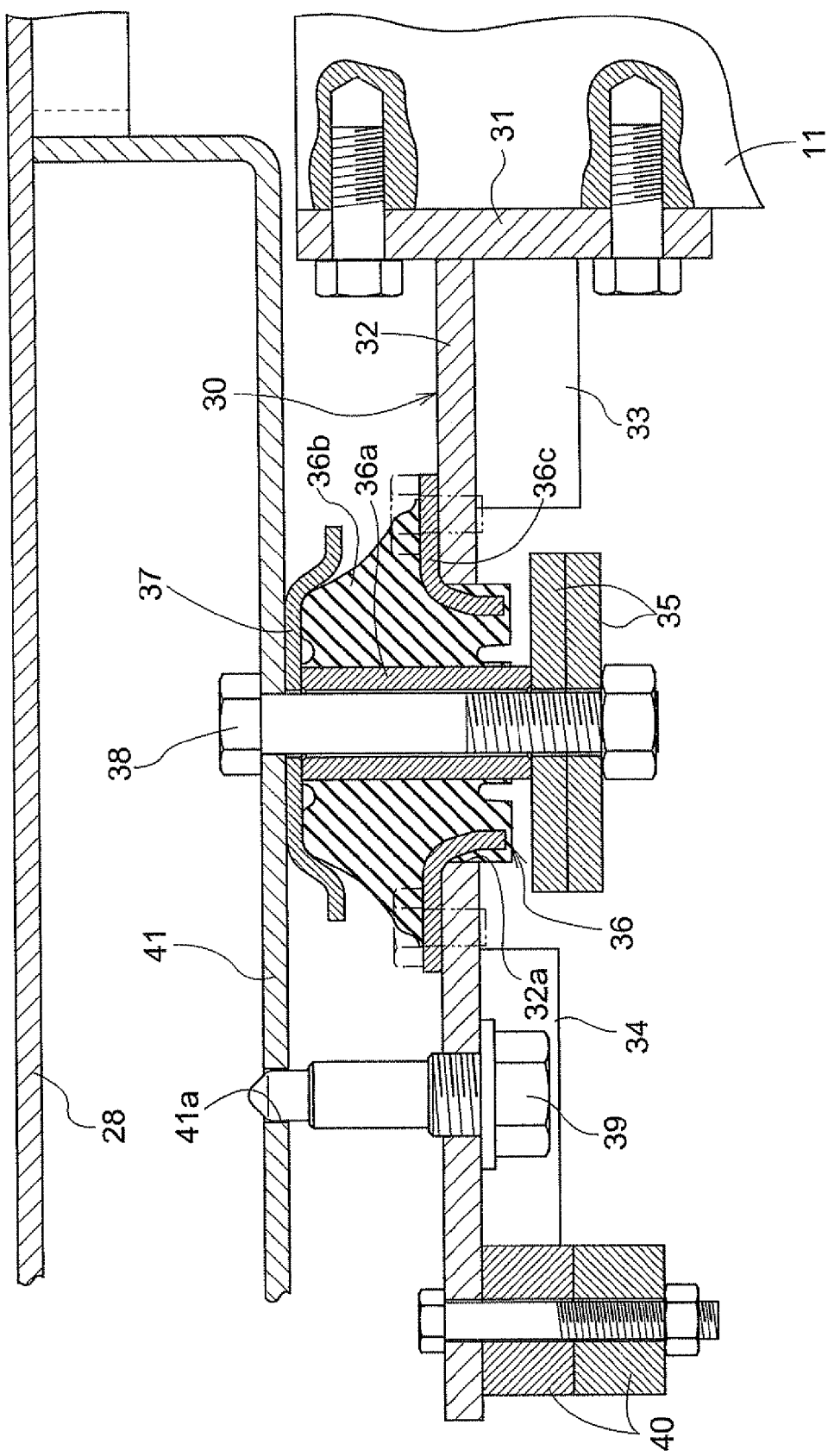
FIG. 4 is a longitudinal sectional back view showing the vicinity of the cabin bracket shown in area "A" of FIG. 3.

The overall structure of the tractor as an example of the vehicle with a cabin will be described based on FIGS. 1 through 4. FIG. 1 shows a side view of the entire tractor, and FIGS. 2 and 3 are a transverse sectional plan view and a side view, respectively, of the cabin 8. FIG. 4 is a transverse sectional back view showing the vicinity of the cabin bracket 30.

As shown in FIGS. 1 through 3, the tractor is configured according to a four-wheel-drive specification in which a pair of left and right front wheels 1 that can steer and drive, as well as a pair of left and right rear wheels 2, are provided to a vehicle body 3. A hood part 5 in which an engine 4 and other components are housed is provided at the front of the vehicle body 3; and a cabin 8 in which a steering handle 6, an operating seat 7, and other components are housed is provided at the rear of the vehicle body 3.

A front frame 10 extends forward from the lower part of the engine 4, and an axle case or the like (not shown) for mounting the front wheels 1 is supported by the front frame 10. A clutch housing 11 extends to the rear from the engine 4, a transmission case 12 positioned below the operating seat 7 is connected to the clutch housing 11, and the drive force from the engine 4 is transmitted to the rear wheels 2.

A link mechanism 13 and a power take-off shaft 14 composed of a pair of left and right lift arms are provided at the rear of the vehicle body 3; a rotary cultivator or the like (not shown) is connected to the link mechanism 13 so as to be capable of being raised and lowered; and the rotary cultivator or the like can be raised, lowered, and driven by connecting the rotary cultivator or the like to the power take-off shaft 14.

The cabin 8 is composed of a cabin frame 20, a front glass 16 for covering the front surface of the cabin frame 20, doors 17 capable of pivoting open and closed that are provided to the entrances on both sides of the cabin frame 20, side glasses 18 provided to the rear parts of the doors 17, and a rear glass 19 for covering the rear surface of the cabin frame 20.

The cabin frame 20 is provided with an angled pipe support frame 21 for supporting the cabin 8, and a lower frame 22 connected to the support frame 21. A pair of left and right front pillars 23, a pair of left and right center pillars 24, and a pair of left and right rear pillars 25 extend upward from the front end, the center part, and the rear end, respectively, of the lower frame 22; and the front pillars 23, the center pillars 24, and the rear pillars 25 are each connected to an upper frame 26. The various frames constituting the cabin frame 20 are formed by welding and molding pipe materials or the like.

The upper part of the cabin frame 20 is covered from above by an outer roof 27 that is formed hollow by a blow molded resin, and the outer roof 27 is fixed to the upper frame 26 via a seal member (not shown).

A floor panel 28 (corresponds to the plate-shaped member) for forming the floor of the cabin 8 is connected to the lower part of the cabin frame 20, and an operating seat 7 is provided at the rear center of the floor panel 28. Angled pipe front-rear frames 15 elongated to the front and rear are fixed to the left and right sides of the lower surface side of the floor panel 28, the distal end parts of the front-rear frames 15 are fixed to brackets 41 described hereinafter, and the rear end parts of the front-rear frames 15 are fixed to support brackets 44.

Rear-wheel fenders 29 positioned on the left and right sides of the cabin 8 are fixed to the lower part of the lower frame 22, and the rear-wheel fenders 29 are composed of a fender body 29A shaped so as to cover the external peripheral parts of the rear wheels 2 from above, and a plate 29B positioned to the inside of the rear wheels 2.

The front glass 16 is fixed across the left and right front pillars 23 that form the cabin frame 20, and the front surface of the cabin frame 20 is covered by the front glass 16. The rear glass 19 is attached across the left and right rear pillars 25 that form the cabin frame 20, and the rear surface of the cabin frame 20 is covered by the rear glass 19.

The doors 17 are attached so as to be able to pivot open and closed about the axes of the rear end parts in the entrances on both sides of the cabin frame 20 formed between the front pillars 23 and the center pillars 24, and side glasses 18 are attached so as to be able to pivot open and closed between the center pillars 24 and the rear pillars 25.

The left and right sides of the front part of the cabin 8 are supported via a rubber isolator 36 (corresponds to an elastic member) by the cabin bracket 30 that extends to the left and right from the clutch housing 11; and the support brackets 44 fixed to the lower end parts of the support frame 21 and positioned on the left and right sides of the rear part are supported via a rubber isolator 46 (corresponds to an elastic member) by a rear cabin bracket 45 that extends from a rear axle case 47.

As shown in FIG. 4, the cabin bracket 30 is integrally formed by welding together a fixing member 31 fixed to the clutch housing 11, a support member 32 for supporting the cabin 8 via the rubber isolator 36, a reinforcing member 33 provided to the base of the cabin bracket 30, and an adjusting member 34 provided to the distal end part of the cabin bracket 30; and the cabin bracket 30 is fixed to the clutch housing 11 by fastening and fixing the fixing member 31 to the clutch housing 11.

The rubber isolator 36 is composed of a cylindrical body 36a through which a connecting bolt 38 is inserted, a main isolator body 36b made of rubber, and a ring-shaped attachment fixture 36c in which an attachment hole is formed. The rubber isolator 36 is fitted and inserted into a rubber insertion hole 32a formed in the support member 32, and the attachment fixture 36c is fastened and fixed to the support member 32, whereby the rubber isolator 36 can be fixed to the cabin bracket 30.

Anti-vibration weights 40 are detachably attached to the distal end part of the cabin bracket 30, and the weight of the distal end part of the cabin bracket 30 can be adjusted by changing the number of anti-vibration weights 40. For example, the characteristics of the vibration transmitted to the cabin 8 via the cabin bracket 30 can be adjusted according to the specifications or other characteristics of the cabin 8 or engine 4.

A bracket 41 is fixed to the lower surface of the floor panel 28 that forms the lower end surface of the cabin frame 20, and a dish-shaped linking member 37 is fixed on the lower surface of the bracket 41. The linking member 37 is brought into contact with the upper surface of the rubber isolator 36, and the connecting bolt 38 is inserted into and fastened in the cylindrical body 36a of the rubber isolator 36, whereby the cabin 8 and the rubber isolator 36 can be connected, and the cabin 8 can be elastically supported on the cabin bracket 30 via the rubber isolator 36.

A plurality of disk-shaped weights 35 is fastened together by the connecting bolt 38 on the lower end of the cylindrical body 36a of the rubber isolator 36, and the characteristics of the vibration transmitted via the cabin bracket 30 can be adjusted by changing the number of weights 35.

A positioning pin 39 is fastened and fixed from below at the distal end part of the cabin bracket 30, and the cabin 8 can be easily and rapidly positioned in the forward-rear and left-right directions in relation to the cabin bracket 30 by fitting the positioning pin 39 into a positioning hole 41a provided to the bracket 41.

Such a configuration of the cabin bracket 30 makes it possible to enhance the rigidity of the cabin bracket 30 through the use of the reinforcing member 33 and the adjusting member 34. As a result, vibration from the clutch housing 11 can be transmitted to the cabin 8 via the portions of the left and right center parts of the cabin bracket 30 that have low rigidity and a low characteristic frequency, and the characteristic frequency of the cabin bracket 30 can be kept low while the strength of the cabin bracket 30 is maintained by the high rigidity provided by the reinforcing member 33.

The anti-vibration weights 40 are mounted to the distal end part of the cabin bracket 30, and the weights 35 are mounted under the rubber isolator 36, whereby the characteristic frequency of the vibration transmitted to the cabin 8 via the cabin bracket 30 can be adjusted by the anti-vibration weights 40 and the weights 35, and the characteristic frequency of the vibration transmitted to the cabin 8 via the cabin bracket 30 and the rubber isolator 36 can be adjusted to a low value. As a result, resonance and the like can be prevented from occurring inside the cabin 8, and droning noise can be prevented from occurring.

[Detailed Structure of the Dynamic Damper]

Figure 5:
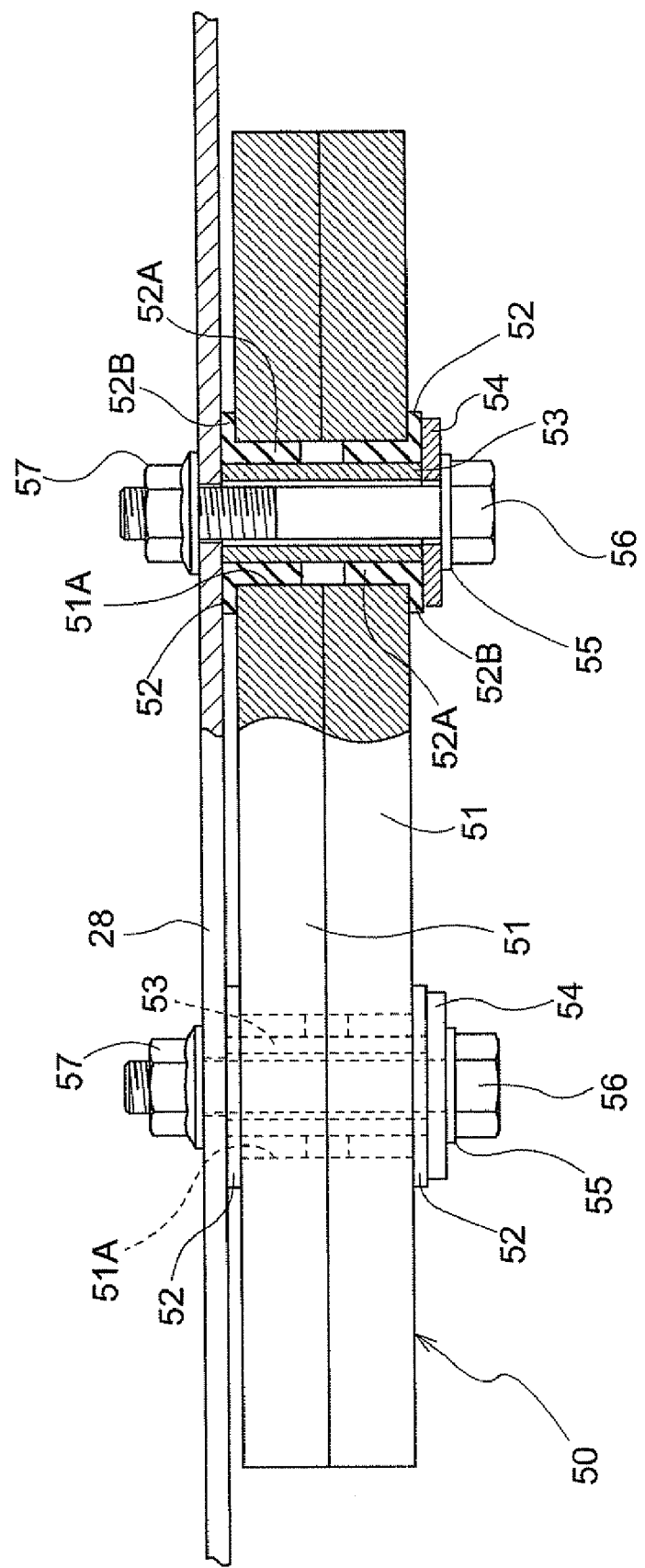
FIG. 5 is a longitudinal sectional side view showing the vicinity of the dynamic damper of the floor panel.
Figure 6:
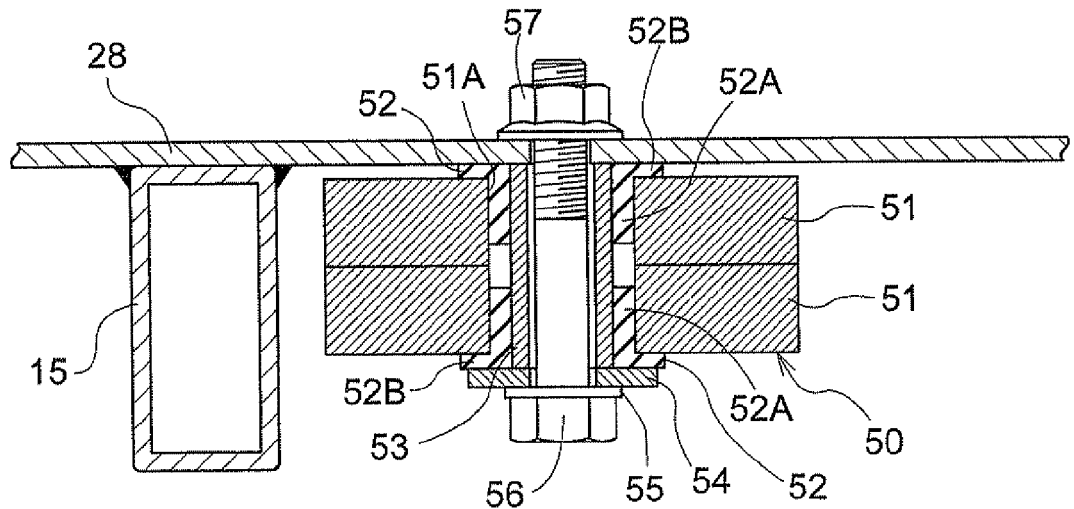
FIG. 6 is a longitudinal sectional back view showing the vicinity of the dynamic damper of the floor panel.
Figure 7:
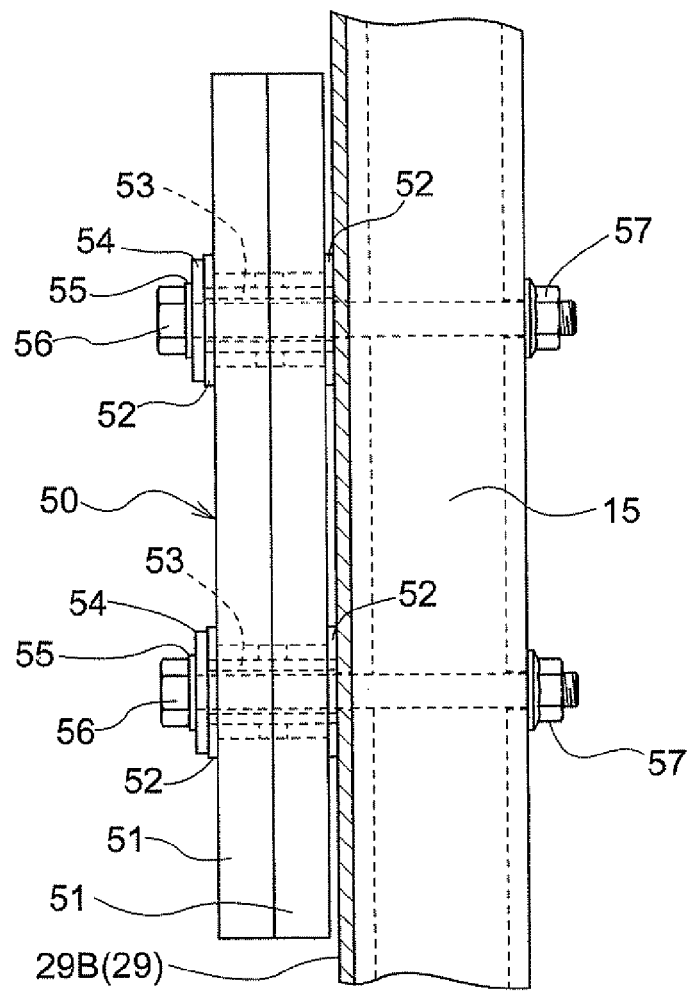
FIG. 7 is a back view showing the vicinity of the dynamic damper of the rear wheel fender.
Figure 8:
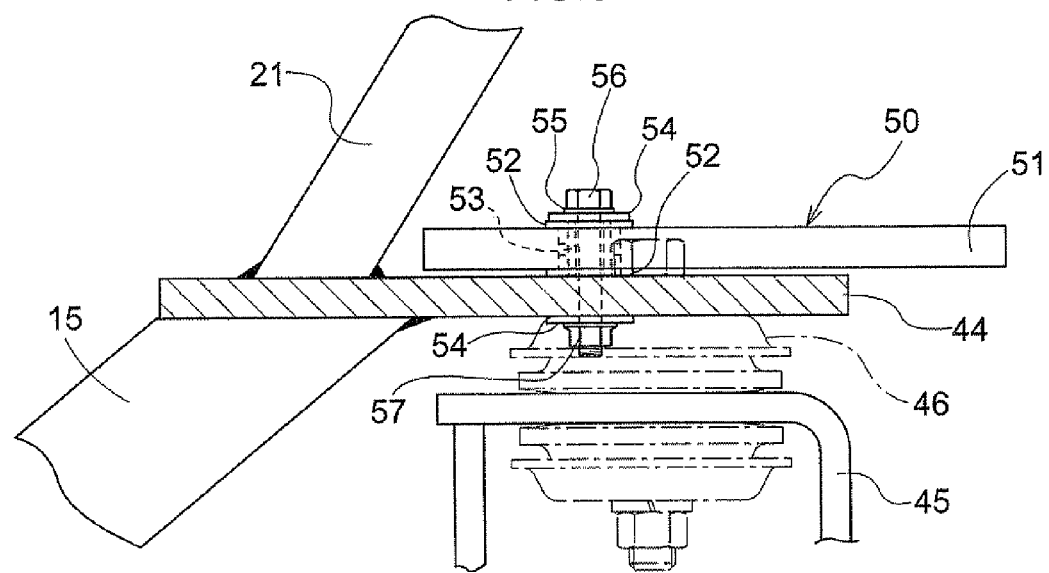
FIG. 8 is a longitudinal sectional side view showing the vicinity of the dynamic damper of the support bracket.

The detailed structure of the dynamic damper 50 will be described based on FIGS. 5 through 8. FIGS. 5 and 6 are a longitudinal sectional side view and a longitudinal sectional back view, respectively, showing the vicinity of the dynamic damper 50 attached to the floor panel 28, FIG. 7 is a back view showing the vicinity of the dynamic damper 50 attached to a rear wheel fender 29, and FIG. 8 is a longitudinal sectional side view showing the vicinity of the dynamic damper 50 attached to a support bracket 44.

As shown in FIGS. 5 and 6, the dynamic damper 50 is composed of weight members 51, rubber isolators 52 as elastic bodies provided with viscosity and elasticity, cylindrical members 53, seating plates 54, and fixing bolts 56. The weight member 51 is composed of a flat bar made of a steel plate, and two vertical attachment holes 51A are formed for fitting the rubber isolators 52. The rubber isolators 52 are made of rubber that is set to a prescribed hardness, and are composed of cylindrical main bodies 52A and flange parts 52B that are formed at the ends of the main bodies 52A.

The cylindrical members 53 are composed of iron and steel pipe materials, and the length of the cylindrical members 53 in the vertical direction is set so that the flange parts 52B at the tops of the rubber isolators 52 are mounted in a state of slight elastic deformation and compression between the upper surface of the upper weight member 51 and the lower surface of the floor panel 28 in a state in which the dynamic damper 50 is mounted to the floor panel 28, and that the flange parts 52B at the bottoms of the rubber isolators 52 are mounted in a state of slight elastic deformation and compression between the upper surfaces of the seating plates 54 and the lower surface of the lower weight member 51. As a result, the weight members 51 can be elastically supported by the floor panel 28, and the weight members 51 can be prevented from being put out of vertical alignment by travel of the tractor or other effects.

Through the elastic support of the weight members 51 by the floor panel 28 via the rubber isolators 52 in this manner, vibration of the floor panel 28 can be more efficiently reduced than in a case in which the weight members 51 is rigidly supported by the floor panel 28, for example, and noise in the cabin 8 can be efficiently reduced. A different configuration may also be adopted in which the weight members 51 are elastically supported by the floor panel 28. For example, a configuration may be adopted in which the weight members 51 are elastically supported by the floor panel 28 through the use of springs (not shown), dampers (not shown), or other elastic bodies.

A configuration is adopted in which the upper surfaces and the lower surfaces of the cylindrical members 53 are in contact with the lower surface of the floor panel 28 and the upper surfaces of the seating plates 54, respectively, and the dynamic damper 50 is fixed to the floor panel 28. The tightening force of the fixing bolts 56 can be applied to the floor panel 28, the cylindrical members 53, and the seating plates 54. As a result, the fixing bolts 56 can be prevented from loosening due to travel of the tractor and other effects, and the dynamic damper 50 can be prevented from dropping out due to travel of the tractor and other effects.

The two weight members 51 are vertically stacked, a rubber isolator 52 is fitted into the two attachment holes 51A from above the upper weight member 51, and a rubber isolator 52 is fitted into the two attachment holes 51A from below the lower weight member 51. The cylindrical members 53 are then fitted into the main bodies 52A of the upper and lower rubber isolators 52, the fixing bolts 56 are inserted so as to sandwich the disk-shaped seating plates 54 and washers 55 from the lower side, and shouldered nuts 57 are fastened and fixed from the top, whereby the weight members 51 can be easily and rapidly attached to the floor panel 28 via the rubber isolators 52.

The spaces between the external peripheral surfaces of the cylindrical members 53 and the internal peripheral surfaces of the rubber isolators 52, and the spaces between the external peripheral surface of the main bodies 52A of the rubber isolators 52 and the internal peripheral surfaces of the attachment holes 51A of the weight members 51 are set so as to be small. As a result, the weight members 51 are prevented from moving out of alignment in the planar direction through travel of the tractor and other effects.

As shown in FIG. 2, the dynamic dampers 50 are disposed along the front-rear frames 15 fixed on the lower surface of the floor panel 28, so that the longitudinal direction of the dynamic dampers 50 is in the front-rear direction, and the right-side dynamic damper 50 and the left-side dynamic damper 50 are positioned slightly out of alignment in the front-rear direction.

As shown in FIGS. 3 and 7, the dynamic dampers 50 are mounted to plates 29B (which correspond to plate-shaped members) of the rear-wheel fenders 29 positioned to the inside of the rear wheels 2. Two passage holes that pass through in the left-right direction are formed in the front-rear frames 15 and the plates 29B; and the weight members 51, 51, the rubber isolators 52, 52, and the cylindrical members 53 that constitute the dynamic dampers 50 are fastened and fixed in the passage holes by the fixing bolts 56 and the shouldered nuts 57 via the seating plates 54 and the washers 55.

A weight member 51 having the same shape as the above-mentioned weight members 51 mounted to the floor panel 28 is mounted to the dynamic dampers 50 mounted to the rear-wheel fenders 29, allowing manufacturing costs to be reduced and common parts to be used by employing the same shape for the weight members 51. The detailed structure of the dynamic dampers 50 is the same as that of the abovementioned dynamic damper 50 mounted to the floor panel 28.

As shown in FIGS. 3 and 8, a dynamic damper 50 is mounted on the upper surface of the support bracket 44 (which corresponds to a plate-shaped member) for supporting the rear part of the cabin 8 on the rear cabin bracket 45 via the rubber isolator 46. A passage hole that passes through in the vertical direction is formed in the support bracket 44, and the weight member 51, the rubber isolators 52, 52; and the cylindrical member 53 that constitute the dynamic damper 50 are fastened and fixed by a fixing bolt 56 and a shouldered nut 57 in the passage hole via seating plates 54 and a washer 55.

A single weight member 51 formed in a shape that conforms to the shape of the support bracket 44 is mounted to the dynamic damper 50 mounted on the support bracket 44) and the weight of the dynamic damper 50 is set so as to be approximately half the weight of the above-mentioned dynamic dampers 50 that are mounted to the floor panel 28 and the rear-wheel fenders 29. The detailed structure of the dynamic damper 50 is the same as that of the abovementioned dynamic damper 50 mounted to the floor panel 28, except that the weight member 51, the rubber isolators 52, and the cylindrical member 53 have different dimensions.

[Method for Setting the Attachment Positions of the Dynamic Dampers]

Figure 9:
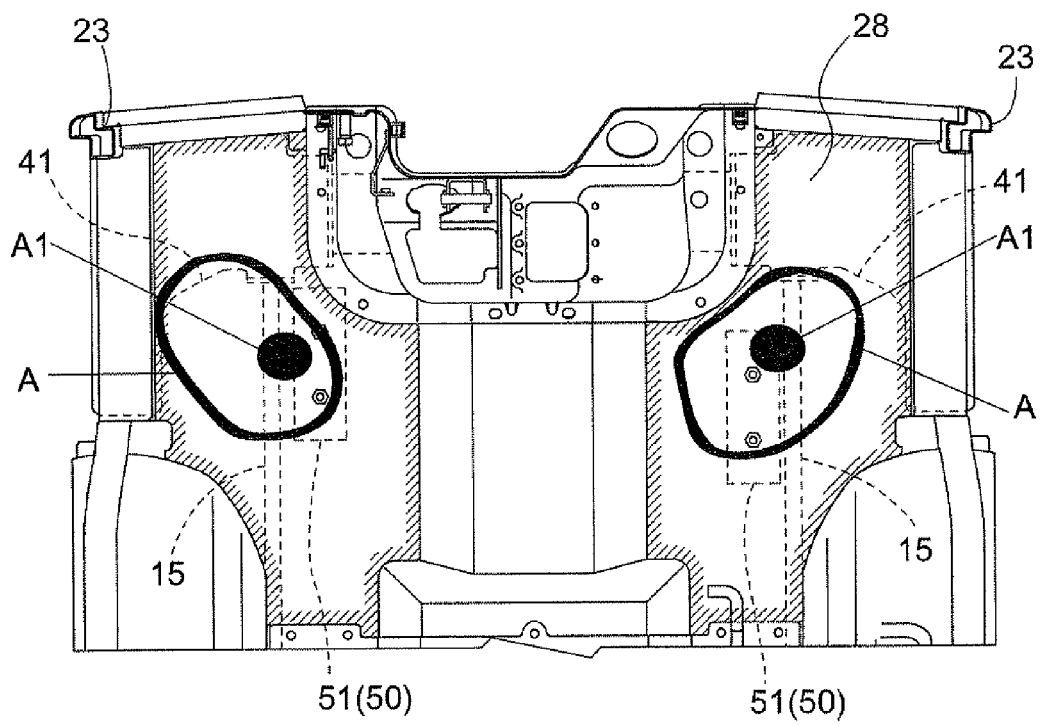
FIG. 9 is a rough plan view showing the method for setting the attachment position of the dynamic damper.

The method for setting the attachment positions of the dynamic dampers 50 will be described based on FIGS. 9 and 10. FIG. 9 is a rough plan view showing the method for setting the attachment positions of the dynamic dampers 50 on the floor panel 28; and FIG. 10 is a rough view in which the floor panel 28 or the like is modeled. In the description given hereinafter, the method will be described for setting the attachment positions of the dynamic dampers 50 mounted to the floor panel 28, but aspects of the method for setting the attachment positions of the dynamic dampers 50 mounted to the rear-wheel fenders 29 and the support bracket 44 other than the difference in the components to which the dynamic dampers 50 are mounted are the same as in the case of mounting to the floor panel 28.

As shown in FIG. 9, conditions that produce vibration (for example, conditions in which the engine 4 is at full throttle) are created, the vibration of the panel surface of the floor panel 28 within the ranges surrounded by the tilted lines in FIG. 9 are measured, and regions are specified (specific frequency regions A) in which vibration occurs at a specific frequency (e.g., 200 Hz) that easily causes noise inside the cabin 8 in the ranges surrounded by the thick lines in FIG. 9.

The center positions (A1 in FIG. 9) of the specific frequency regions A surrounded by the thick lines in FIG. 9 are set as the attachment positions of the dynamic dampers 50. The regions in which vibration occurs at the specific frequency likely to cause noise inside the cabin 8 are thus specified, and the positions for attaching the dynamic dampers 50 are set on the basis of the results of measuring the frequency of vibration in the floor panel 28.

As described above, the dynamic dampers 50 in this tractor are mounted in positions along the front-rear frames 15 in positions near the regions A1 in FIG. 9 in the positional relationship with the front-rear frames 15.

As shown in FIG. 10A, when the floor panel 28 of the tractor is modeled, a beam fixed at both ends such as the one shown in FIG. 10A can be assumed. Vibration can be effectively reduced by mounting a dynamic damper 50 in a position (near the maximum-amplitude portion L) of significant vibration near the middle of the beam fixed at both ends.

When the support bracket 44 and the plates 29B of the rear-wheel fenders 29, for example, are modeled, a beam fixed at one end, such as the one shown in FIG. 10B, can be assumed, and the distal end parts of the plates 29B and the support bracket 44 correspond to the locations (locations near the maximum-amplitude portion L) of significant vibration.

As described above, the vibration of the panel surface of the floor panel 28 is measured, and the specific frequency regions A are specified in which vibration at a specific frequency occurs, whereby the regions of the panel surface of the floor panel 28 can be specified that correspond to the maximum-amplitude portions L of the beam fixed at both ends shown in FIG. 10A. By mounting the dynamic dampers 50 in the positions A1 of the centers of the specific frequency regions A, the vibration of the floor panel 28 can be effectively dampened by the dampening effects of the mass of the weight member 51 and the rubber isolators 52 that are provided with viscosity and elasticity.

The weight of the dynamic dampers 50 is set so that the dynamic dampers 50 can effectively dampen the vibration of the floor panel 28 on the basis of the results of a plurality of measurement in which the number of weight members 51 is varied when a plurality of conditions is produced in which the number or thickness of the weight members 51 of the dynamic dampers 50 in the abovementioned attachment positions is varied, and vibration is generated.

[Results of Measuring Vibration Acceleration and Noise]

Figure 11:
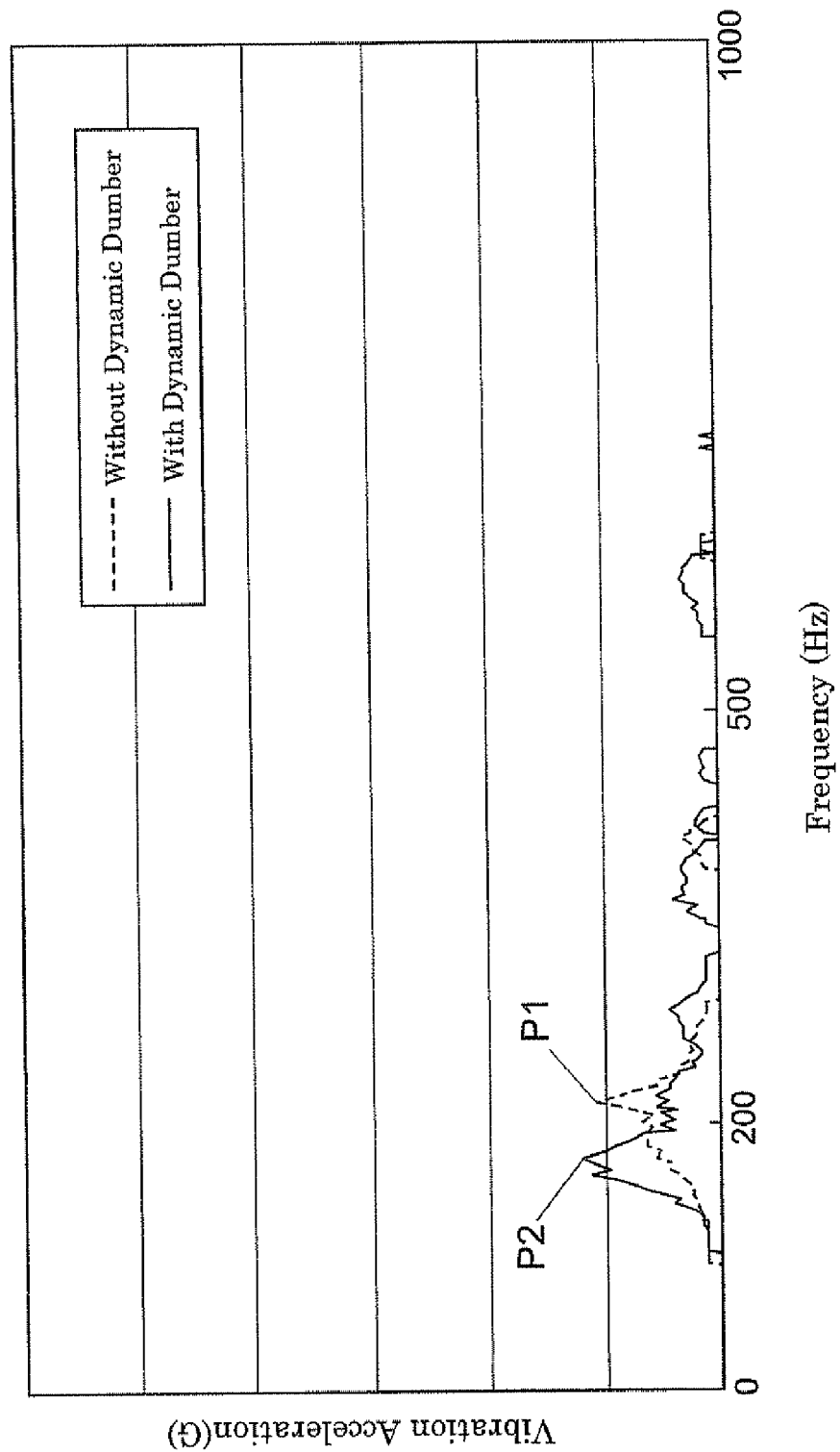
FIG. 11 is a graph showing an example of the results of measuring the vibration acceleration of each frequency in the floor panel.

The results of measuring the vibration acceleration for each frequency, and the results of measuring the noise when the dynamic dampers 50 were mounted, will be described based on FIGS. 11 through 17. FIGS. 11, 13, and 15 are graphs comparing two types of data: data in which a vibration pickup (not shown) was mounted in a position for measuring vibration (in the case of the floor panel 28, for example, the A1 positions in FIG. 9), the periphery of the position in which the vibration pickup was mounted was struck by a hammer or the like (not shown) to generate vibration, and the vibration acceleration (G) for each frequency was measured by the vibration pickup in a state in which a dynamic damper 50 was attached to the floor panel 28 (FIG. 11), the rear-wheel fenders 29 (FIG. 13), or the support bracket 44 (FIG. 15); and data in which a vibration pickup was mounted in a position for measuring vibration, the periphery of the position in which the vibration pickup was mounted was struck by a hammer or the like to generate vibration, and the vibration acceleration (G) for each frequency was measured by the vibration pickup in a state in which the dynamic damper 50 was not attached.

Figure 12:
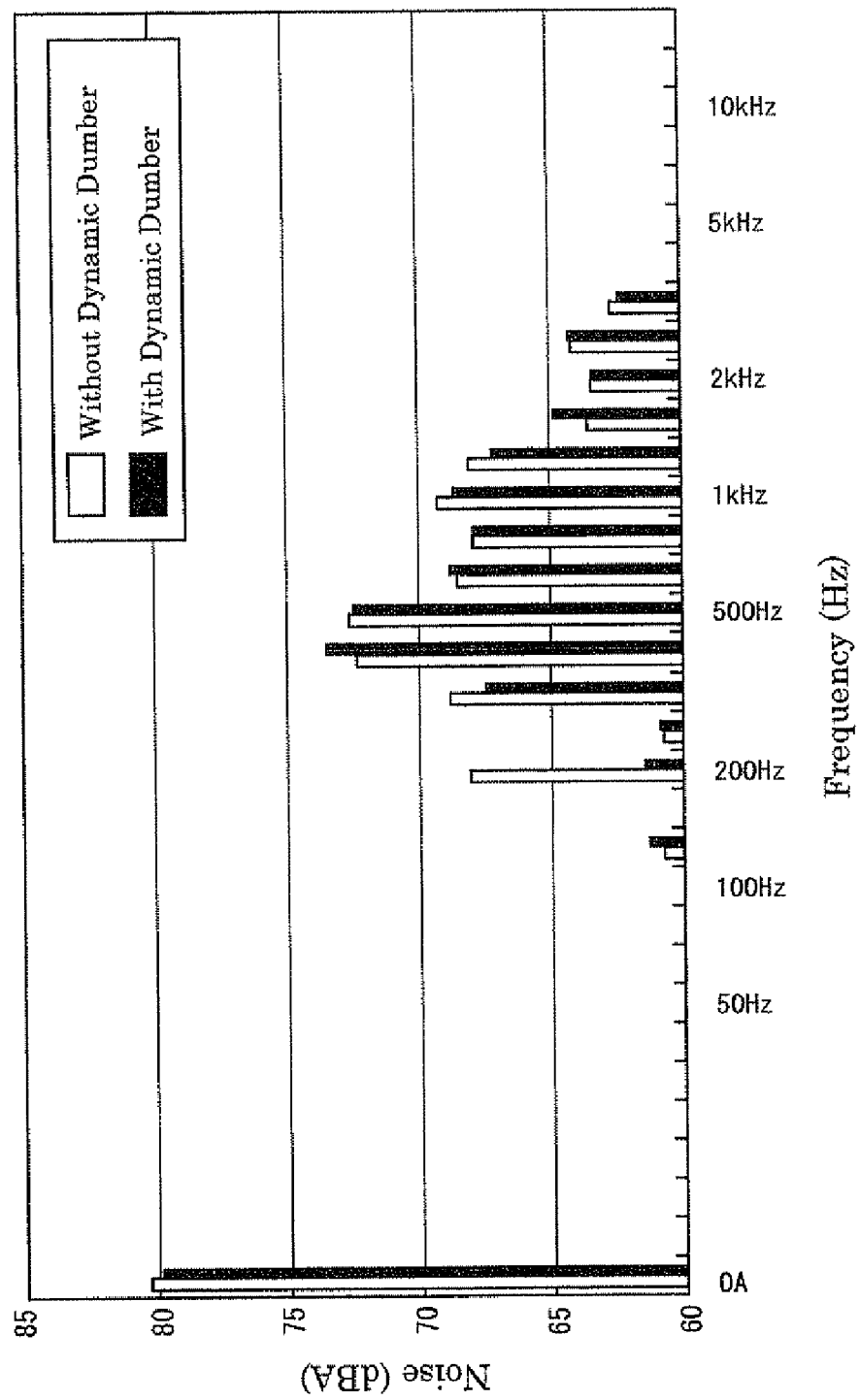
FIG. 12 is a graph showing an example of the results of measuring the noise for each frequency when the dynamic damper is mounted to the floor panel.
Figure 13:
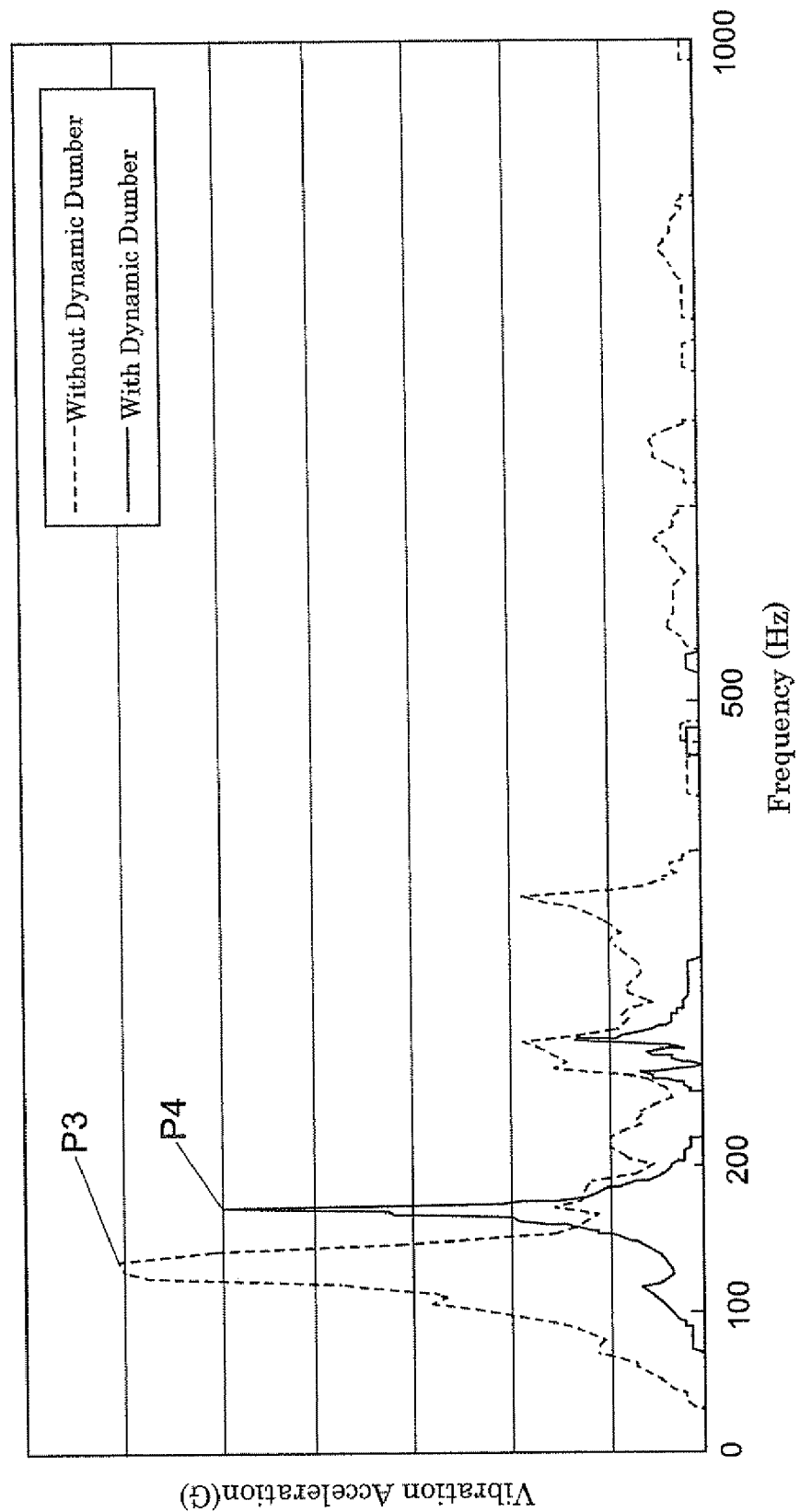
FIG. 13 is a graph showing an example of the results of measuring the vibration acceleration for each frequency in the rear wheel fender.
Figure 14:
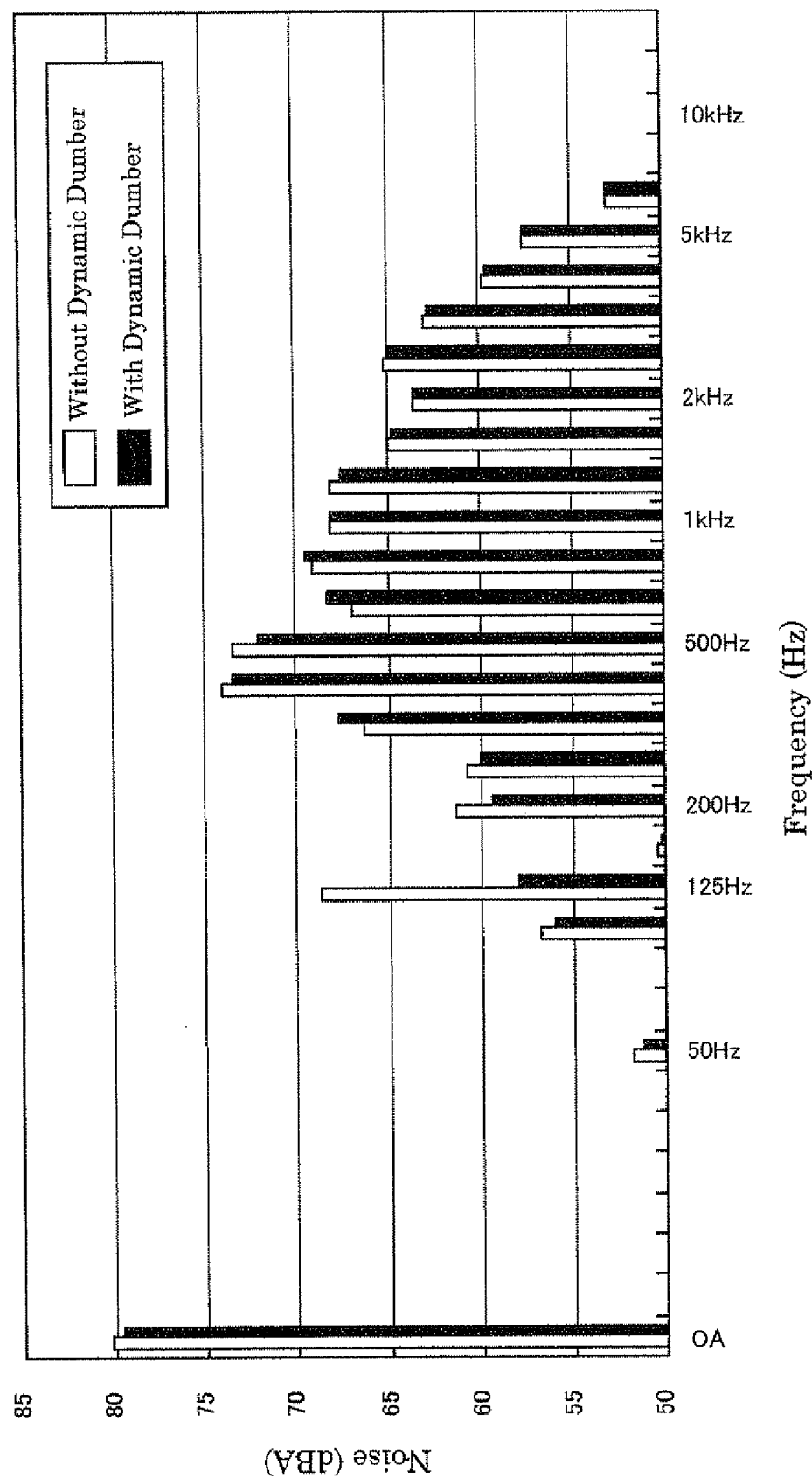
FIG. 14 is a graph showing an example of the results of measuring the noise for each frequency when the dynamic damper is mounted to the rear wheel fender.
Figure 15:
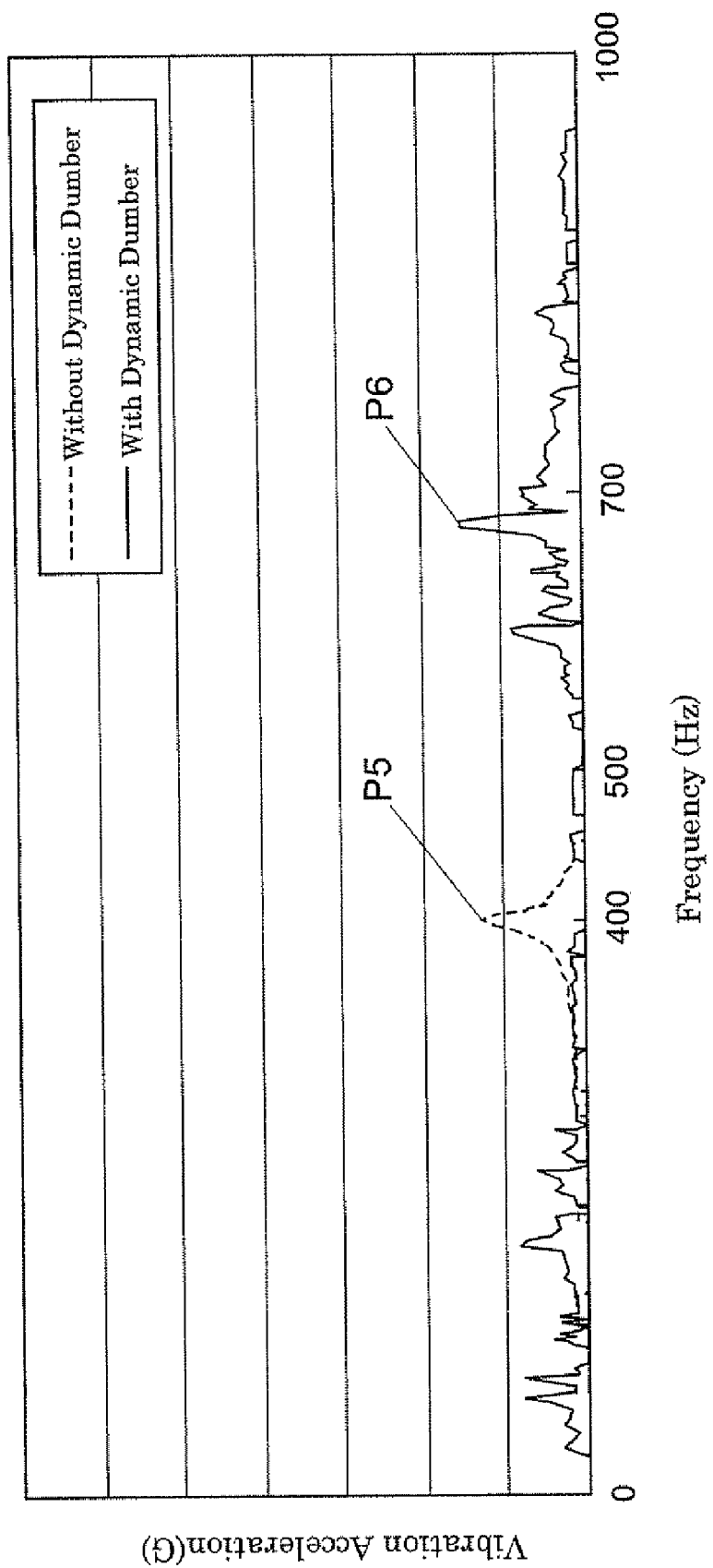
FIG. 15 is a graph showing an example of the results of measuring the vibration acceleration for each frequency in the support bracket.
Figure 16:
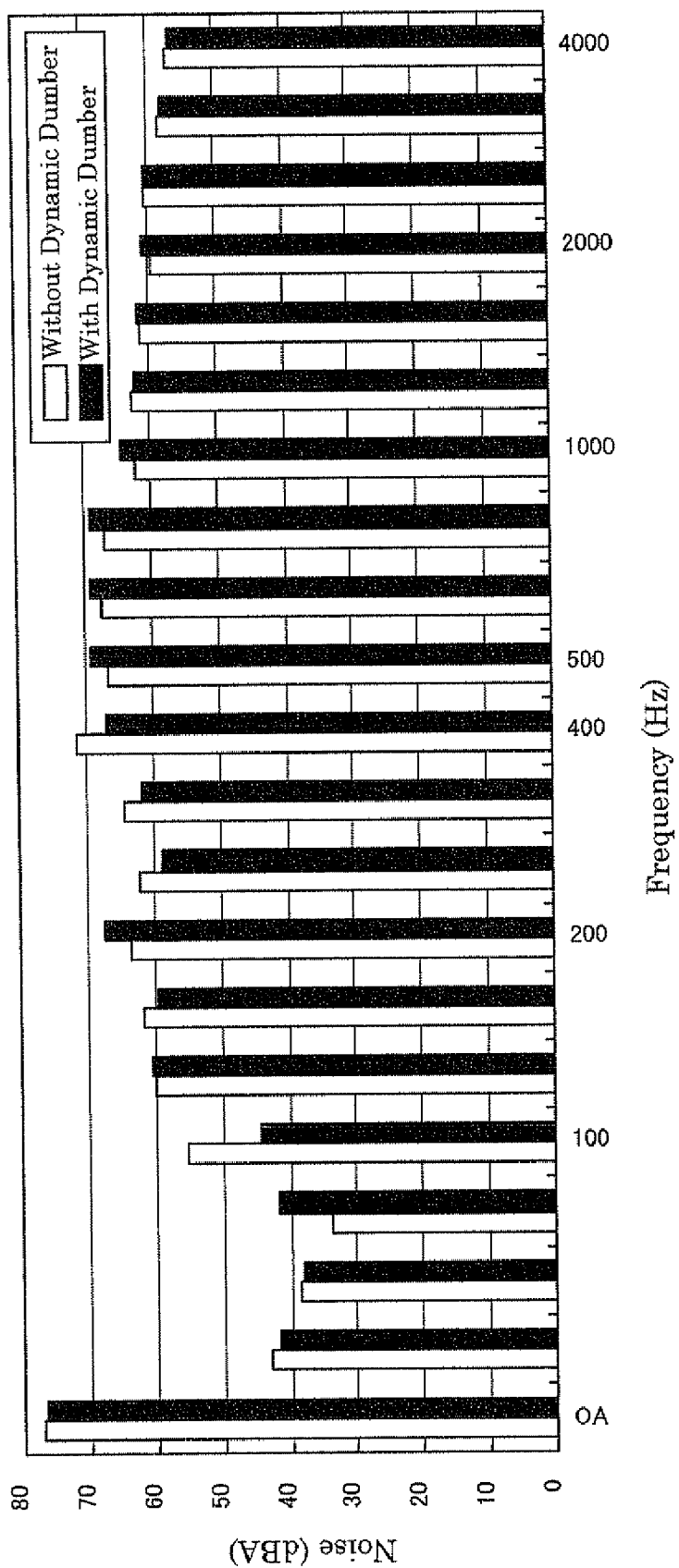
FIG. 16 is a graph showing an example of the results of measuring the noise for each frequency when the dynamic damper is mounted to the support bracket.

FIGS. 12, 14, and 16 are graphs comparing two types of data: data in which the engine 4 was set to full throttle, and the noise (dBA) was measured in the vicinity of the ears of the operator in the operating seat 7 in a state in which the dynamic damper 50 was attached to the floor panel 28 (FIG. 12), the rear-wheel fenders 29 (FIG. 14), or the support bracket 44 (FIG. 16); and data in which the engine 4 was set to full throttle, and the noise (dBA) was measured in the vicinity of the ears of the operator seated in the operating seat 7 in a state in which the dynamic damper 50 was not attached. In FIGS. 12, 14, and 16, the spectral values of the noise (dBA) for each ⅓ octave band in the A characteristic are indicated in the form of a bar graph for each ⅓ octave band center frequency. "OA value" is an abbreviation for the overall value, and is a value that is computed from the measured value of the noise for each octave band and used for comprehensive evaluation of the noise.

FIG. 17 is a table comparing the spectral values and OA values of the noise in cases in which the dynamic damper 50 is mounted to the floor panel 28, the rear-wheel fenders 29, and the support bracket 44.

As shown in FIG. 11, when the dynamic damper 50 is mounted to the floor panel 28, the frequency at the peak value of the vibration acceleration can be moved from approximately 210 Hz (P1 in FIG. 11) to approximately 170 Hz (P2 in FIG. 11), and the vibration acceleration of the floor panel 28 near a frequency of 200 Hz can be kept low in comparison with a case in which the dynamic damper 50 is not mounted. As a result, vibration of the floor panel 28 near 200 Hz that easily causes noise inside the cabin 8 can be kept low, and resonation of the floor panel 28 can be suppressed.

As shown in FIG. 12, when the dynamic damper 50 is mounted to the floor panel 28, the spectral value of the noise at a center frequency of 200 Hz can be reduced approximately 6.7 dBA, and the OA value can be reduced approximately 0.5 dBA in comparison with the case in which the dynamic damper 50 is not mounted. As a result, noise near the ears of the operator seated in the operating seat 7 can be reduced.

As shown in FIG. 13, when the dynamic damper 50 is mounted to the rear-wheel fenders 29, the frequency at the peak value of the vibration acceleration can be moved from approximately 125 Hz (P3 in FIG. 12) to approximately 170 Hz (P4 in FIG. 12), and the vibration acceleration near a frequency of 125 Hz can be kept low in comparison with the case in which the dynamic damper 50 is not mounted. The vibration acceleration near a frequency of 200 Hz can also be kept low. As a result, vibration of the rear-wheel fenders 29 near 125 Hz and 200 Hz that easily causes noise inside the cabin 8 can be kept low, and resonation of the rear-wheel fenders 29 can be suppressed.

As shown in FIG. 14, when the dynamic damper 50 is mounted to the rear-wheel fenders 29, the spectral value of the noise at a center frequency of 125 Hz can be reduced approximately 10 dBA, the spectral value of the noise at a center frequency of 200 Hz can be reduced approximately 2.0 dBA, and the OA value can be reduced approximately 0.6 dBA in comparison with the case in which the dynamic damper 50 is not mounted. As a result, noise near the ears of the operator seated in the operating seat 7 can be reduced.

As shown in FIG. 15, when the dynamic damper 50 is mounted to the support bracket 44, the frequency at the peak value of the vibration acceleration can be moved from approximately 400 Hz (P5 in FIG. 15) to approximately 680 Hz (P6 in FIG. 15), and the vibration acceleration near a frequency of 400 Hz can be kept low in comparison with the case in which the dynamic damper 50 is not mounted. As a result, vibration of the support bracket 44 near 400 Hz that easily causes noise inside the cabin 8 can be kept low, and resonation of the support bracket 44 can be suppressed.

As shown in FIG. 16, when the dynamic damper 50 is mounted to the support bracket 44, the spectral value of the noise at a center frequency of 400 Hz can be reduced approximately 4.4 dBA, and the OA value can be reduced approximately 0.4 dBA in comparison with the case in which the dynamic damper 50 is not mounted. As a result, noise near the ears of the operator seated in the operating seat 7 can be reduced.

As shown in FIG. 17, by mounting the dynamic damper 50 to the floor panel 28, the rear-wheel fenders 29, and the support bracket 44, it is possible to reduce the spectral values of noise at frequencies that easily cause noise near the ears of the operator seated at the operating seat 7 of the cabin 8 through the vibration of the floor panel 28, the rear-wheel fenders 29, and the support bracket 44; and the OA value of noise near the ears of the operator seated in the operating seat 7 can be reduced.

When the dynamic damper 50 is mounted to the floor panel 28, the spectral value of noise for which the center frequency is 200 Hz can be significantly reduced, the spectral value of noise for which the center frequency is 125 Hz can be significantly reduced when the dynamic damper 50 is mounted to the rear-wheel fenders 29, and the spectral value of noise for which the center frequency is 400 Hz can be significantly reduced when the dynamic damper 50 is mounted to the support bracket 44. As a result, the spectral value of noise in a targeted frequency band can be effectively reduced, and the manifestation of these effects in the OA value as a noise measurement result can be confirmed through the measurement data.

It was also confirmed that noise-reducing effects in the cabin 8 were demonstrated at different frequencies by the dynamic dampers 50 mounted to the floor panel 28, the rear-wheel fenders 29, and the support bracket 44.

In FIGS. 11 through 17, measurement data for the vibration acceleration and noise were given by way of example in cases in which the dynamic damper 50 was mounted to the floor panel 28, the rear-wheel fenders 29, or the support bracket 44, but noise inside the cabin 8 can be even more effectively reduced when dynamic dampers 50 are mounted in all or any two of the floor panel 28, the rear-wheel fenders 29, and the support bracket 44.

In the previously described embodiment, an example was described in which the dynamic damper 50 (weight member 51) was attached to the floor panel 28, the rear-wheel fenders 29, and the support bracket 44, but a dynamic damper 50 (weight member 51) may be attached to a different plate-shaped member constituting the cabin 8. For example, a dynamic damper 50 (weight member 51) may be attached to the outer roof 27 or another component. The position in which the dynamic damper 50 (weight member 51) is attached to the floor panel 28 or other component may also be varied. For example, a dynamic damper 50 (weight member 51) may be mounted to a part on the external periphery of the operating seat 7 at the rear of the floor panel 28.

In the previously described embodiment, an example was described in which the weight members 51 were attached to the floor panel 28, the rear-wheel fenders 29, and the support bracket 44 via rubber isolators 52, and were configured so as to function as dynamic dampers 50, but a configuration may easily be adopted in which weight members 51 are not attached via rubber isolators 52. Adopting such a configuration makes it possible to simplify the attachment structure of the weight members 51 and reduce manufacturing cost.

In the previously described embodiment, an example was described in which the weight members 51 were attached to the floor panel 28, the rear-wheel fenders 29, and the support bracket 44 by fixing bolts 56, but a different method may also be employed for attaching the weight members 51 to the floor panel 28 and other components, and a configuration may be adopted in which rubber isolators 52 are bonded to the weight members 51, for example, and the rubber isolators 52 bonded to the weight members 51 are bonded to the floor panel 28 and other components. When the weight members 51 are not mounted via the rubber isolators 52, the weight members 51 may be welded to the floor panel 28 and other components.

Embodiment 2

An embodiment relating to the acoustic absorbent material will next be described.

[Overall Structure of the Tractor]

Figure 18:
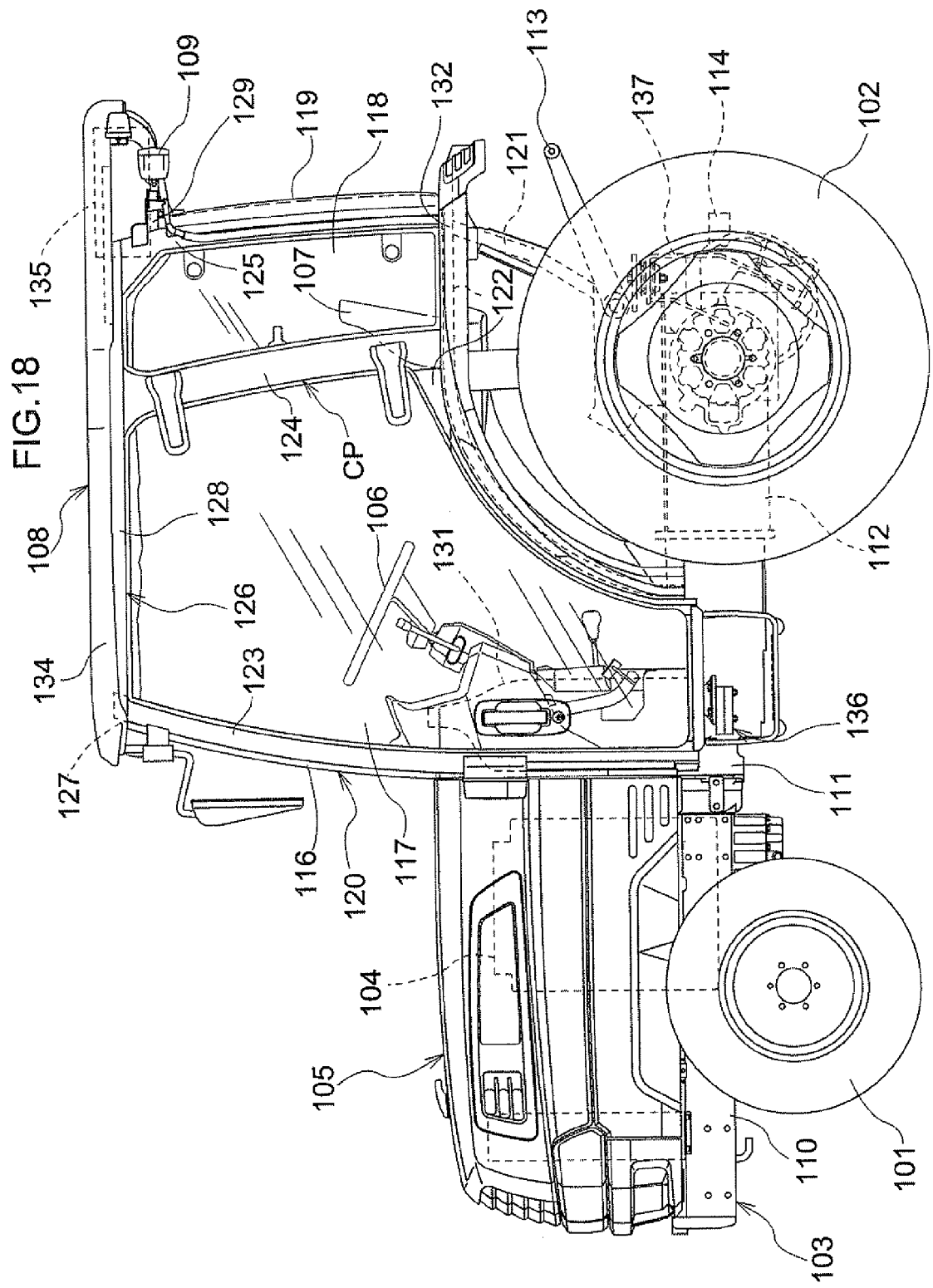
FIG. 18 is a left side view showing the entire tractor.
Figure 19:
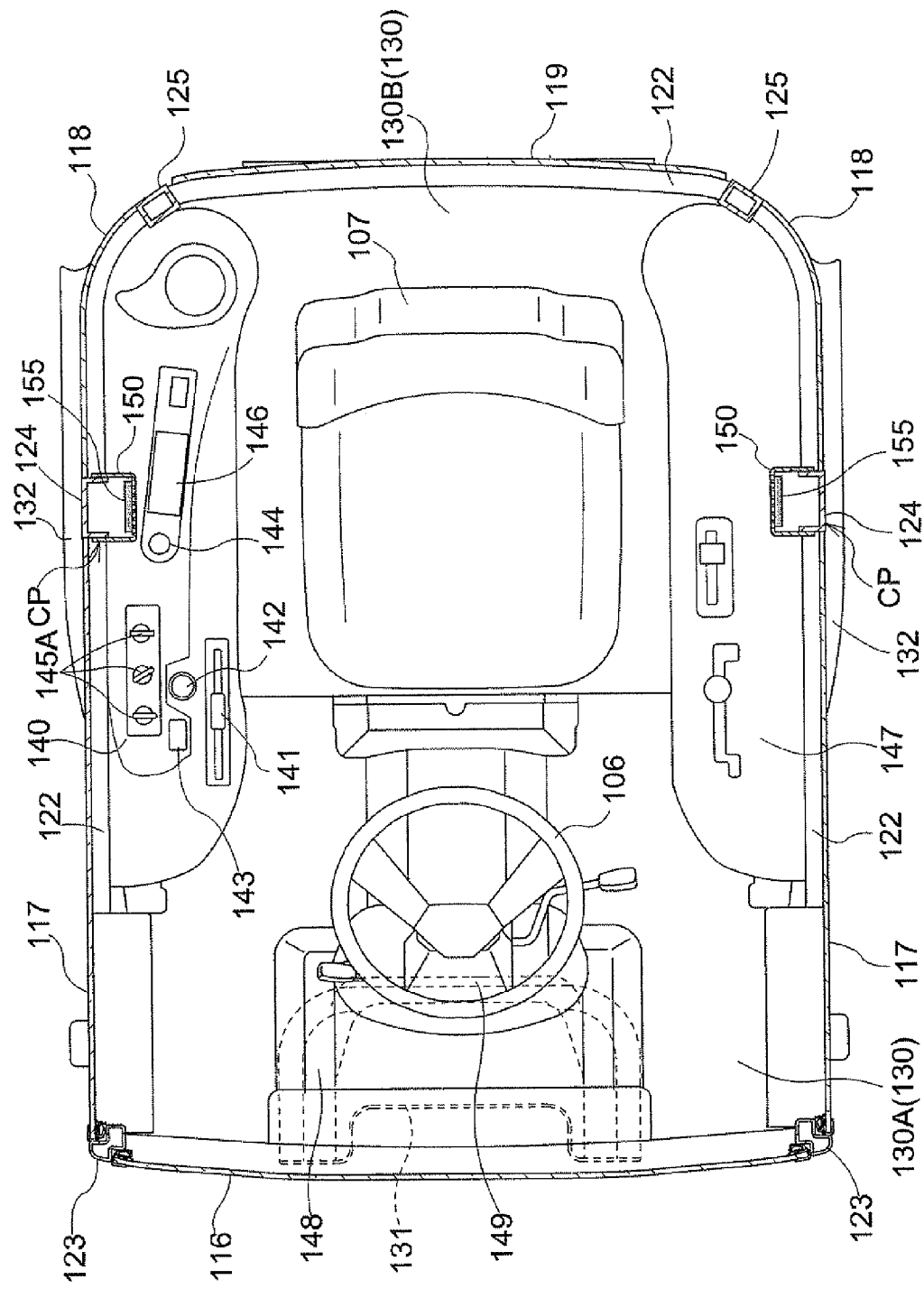
FIG. 19 is a transverse sectional plan view showing the structure of the cabin interior.
Figure 20:
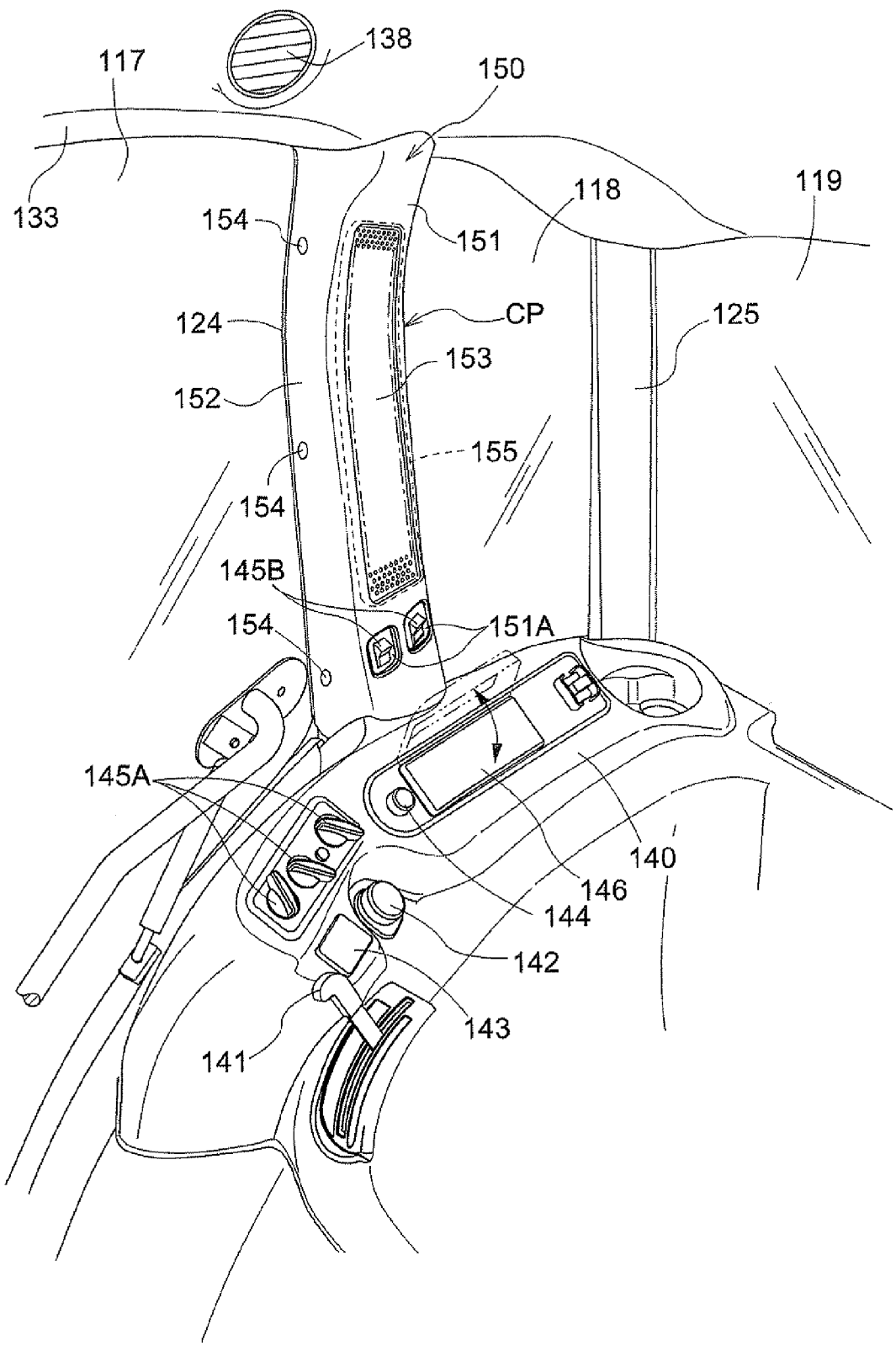
FIG. 20 is a perspective view showing the structure in the vicinity of the center pillar.

The overall structure of the tractor as an example of the vehicle with a cabin will be described based on FIGS. 18 through 20. FIG. 18 is a side view showing the entire tractor; and FIGS. 19 and 20 are a transverse sectional plan view of the cabin 108, and a perspective view showing the left rear part of the cabin 108 from the operating seat 107.

As shown in FIG. 18, the tractor is configured according to a four-wheel-drive specification in which a pair of left and right front wheels 101 capable of steering and driving, as well as a pair of left and right rear wheels 102 capable of driving, are provided to a vehicle body 103. A hood part 105 in which an engine 104 and other components are housed is provided at the front of the vehicle body 103; and a cabin 108 in which a steering handle 106, an operating seat 107, and other components are housed is provided at the rear of the vehicle body 103. A plurality of work lamps 109 is provided to the rear upper part of the cabin 108, and the work lamps 109 can illuminate the rear so that cultivation or the like can be performed.

A main frame 110 extends forward from the lower part of the engine 104, and an axle case or the like (not shown) for mounting the front wheels 101 is supported by the main frame 110. A clutch housing 111 extends to the rear from the engine 104, a transmission case 112 positioned below the operating seat 107 is connected to the clutch housing 111, and the drive force from the engine 104 is transmitted to the rear wheels 102.

A link mechanism 113 and a power take-off shaft 114 composed of a pair of left and right lift arms are provided at the rear of the vehicle body 103; a rotary cultivator or the like (not shown) is connected to the link mechanism 113 so as to be capable of being raised and lowered; and the rotary cultivator or the like can be raised, lowered, and driven by connecting the rotary cultivator or the like to the power take-off shaft 114.

[Detailed Structure of the Cabin]

The cabin 108 is composed of a cabin frame 120, a front glass 116 for covering the front surface of the cabin frame 120, doors 117 capable of pivoting open and closed that are provided to the entrances on both sides of the cabin frame 120, side glasses 118 provided to the rear parts of the doors 117, and a rear glass 119 for covering the rear surface of the cabin frame 120. The cabin 108 is elastically supported by a pair of left and right front cabin brackets 136 fixed to the left and right sides of the clutch housing 111, and a pair of left and right rear cabin brackets 137 that extend from the rear upper part of the transmission case 112.

The cabin frame 120 is provided with an angled pipe support frame 121 for supporting the cabin 108, and a lower frame 122 or the like connected to the support frame 121. The various frames constituting the cabin frame 120 are connected by welding and molding pipe materials or the like.

A pair of left and right front pillars 123, a pair of left and right center pillars CP, and a pair of left and right rear pillars 125 extend upward from the front end, the center part, and the rear end, respectively, of the lower frame 122; and the front pillars 123, the center pillars CP, and the rear pillars 125 are each connected to an upper frame 126.

The upper frame 126 is formed by welding and molding a front cross member 127 having a bracket-shaped longitudinal sectional shape, a pair of left and right side members 128 having a bracket-shaped longitudinal sectional shape, and a rear cross member 129 having a bracket-shaped longitudinal sectional shape, wherein an inner roof 133 is mounted to the lower part of the upper frame 126, and an outer roof 134 is mounted so as to cover the upper frame 126 from above.

The rear cross member 129 is positioned at a height that is a prescribed distance lower than the upper end parts of the left and right rear pillars 125, and a ventilation unit 135 is provided in the space formed between the rear cross member 129 and the outer roof 134.

The peripheral edge part of the inner roof 133 is mounted on the lower surfaces of the front cross member 127, the left and right side members 128, and the rear cross member 129; and the peripheral edge part of the outer roof 134 is supported by the upper surfaces of the front cross member 127 and the left and right side members 128.

A floor panel 130 for forming the floor of the cabin 108 is connected to the lower surface of the cabin frame 120; and rear-wheel fenders 132 formed in a shape that covers the external peripheral parts of the rear wheels 102 from above are fixed to the left and right sides of the floor panel 130. The floor panel 130 is provided with a step floor panel 130A at the front of the cabin 108, and a sheet floor panel 130B at the rear of the cabin 108; and an operating seat 107 is provided in the center in the left-right direction of the sheet floor panel 130B.

A front frame 131 extends upward from the step floor panel 130A in the center in the left-right direction of the front part of the cabin 108, and a steering handle 106 is supported on the front frame 131.

The front glass 116 is fixed across the left and right front pillars 123 that form the cabin frame 120, and the front surface of the cabin frame 120 is covered by the front glass 116. The rear glass 119 is attached across the left and right rear pillars 125 that form the cabin frame 120, and the rear surface of the cabin frame 120 is covered by the rear glass 119.

The doors 117 are attached so as to be able to pivot open and closed about the axes of the rear end parts in the entrances on both sides of the cabin frame 120 formed between the front pillars 123 and the center pillars CP, and side glasses 118 are attached so as to be able to pivot open and closed between the center pillars CP and the rear pillars 125.

[Detailed Structure of the Cabin Interior]

As shown in FIGS. 19 and 20, the operating seat 107 is provided in the center in the left-right direction of the rear part of the cabin 108, and an operating box 140 made of a resin is provided to the right of the operating seat 107. A position lever 141 for controlling the raising and lowering position of the link mechanism 113, a power take-off selection switch 142 for switching the drive state of the power take-off shaft 114 between an independent drive state and a state of synchrony with the travel speed, an auto switch 43 for providing rolling control of the implement and various other types of control, a cultivation depth setting dial 144 for setting the cultivation depth of the implement, and other work controls are concentrated in the operating box 140.

A plurality of operating switches 145A for operating the ventilation unit 135 is provided to the operating box 140, and the force and other characteristics of the wind blown into the cabin 108 from the ventilation unit 135 can be adjusted by operating the operating switches 145A. A plurality of dial-type controls (not shown) is disposed within a cover 146 provided to the operating box 140, and adjustment of the rolling angle of the implement, and setting of the upper limit position of the implement can be performed by dialing the controls.

A protective cover 147 made of a resin is provided to the left of the operating seat 107, and the tops of the left and right rear-wheel fenders 132 are covered by the abovementioned resin operating box 140 and the resin protective cover 147.

The front frame 131 that extends upward from the step floor panel 130A is covered by a center cover 148, and the lower part of the steering handle 106 is covered by a handle cover 149.

Left and right ventilation ducts (not shown) extend forward between the outer roof 134 and the inner roof 133 from the left and right sides of the ventilation unit 135, and a plurality of air outlets is formed in the left and right ventilation ducts. A plurality of outlet grilles 138 capable of changing the direction of airflow from the ventilation ducts is provided to the inner roof 133, the air outlets of the ventilation ducts are connected to the outlet grilles 138, and the air from the ventilation unit 135 is blown in the direction adjusted by the operator from the outlet grilles 138.

[Attachment Structure of the Acoustic Absorbent Material]

Figure 21:
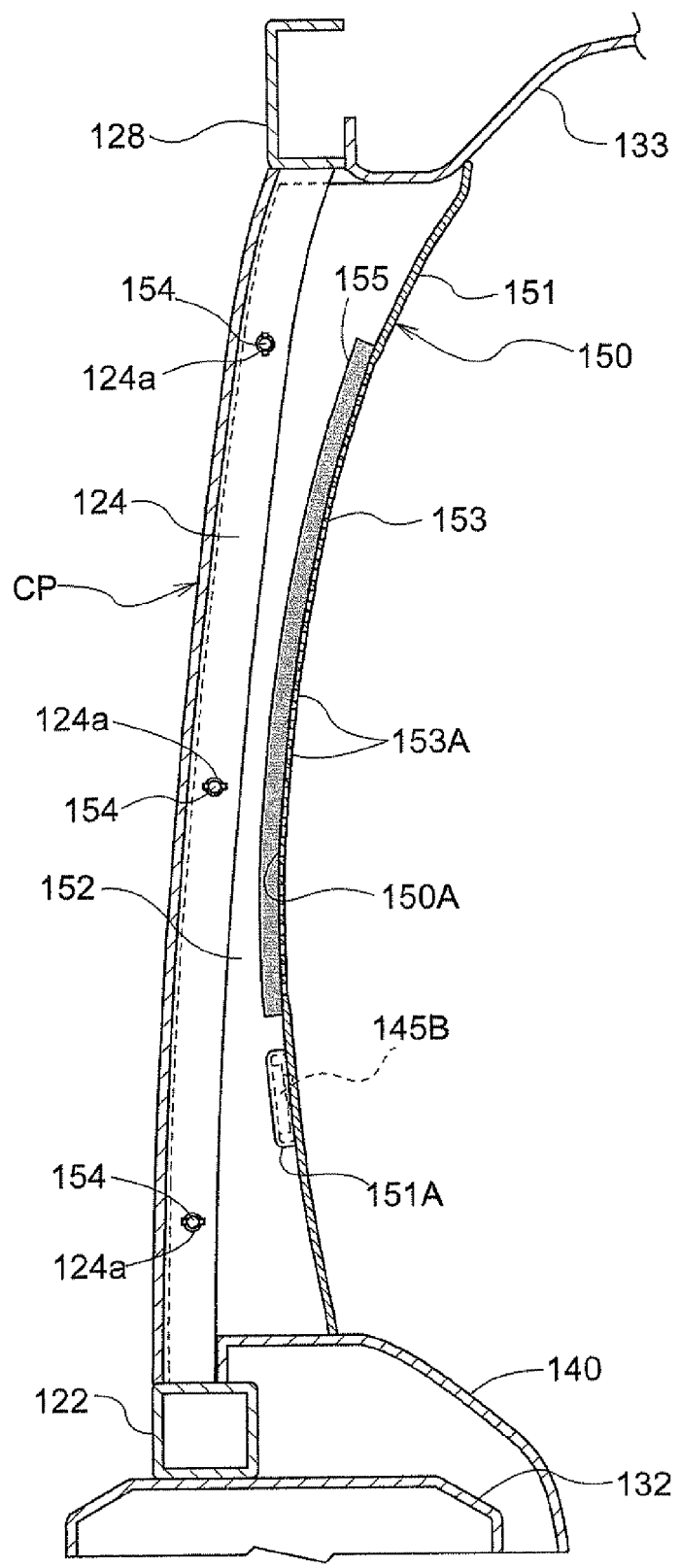
FIG. 21 is a longitudinal sectional front view showing the structure in the vicinity of the center pillar.
Figure 22:
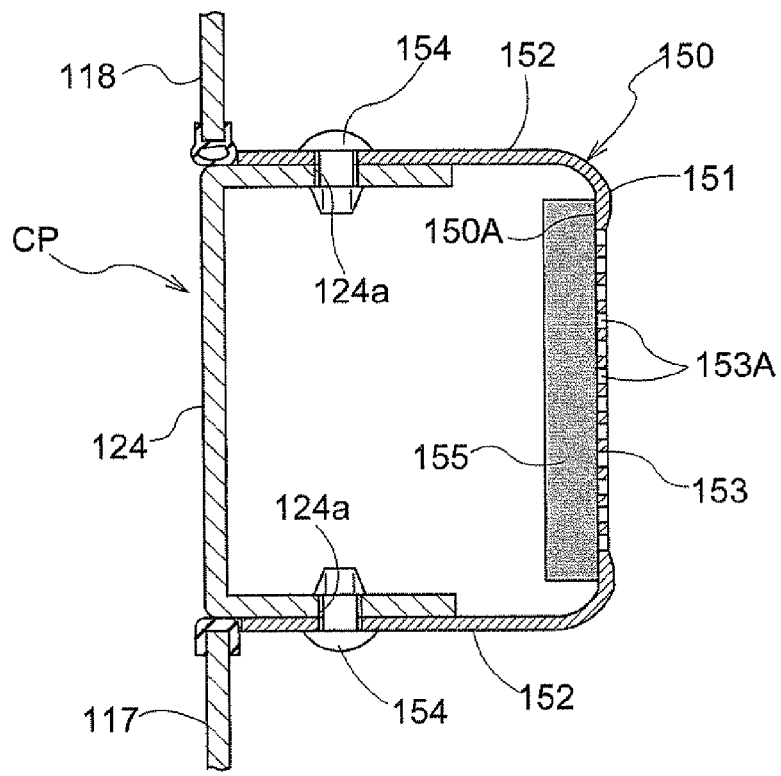
FIG. 22 is a transverse sectional plan view showing the structure of the vicinity of the center pillar.
Figure 23:
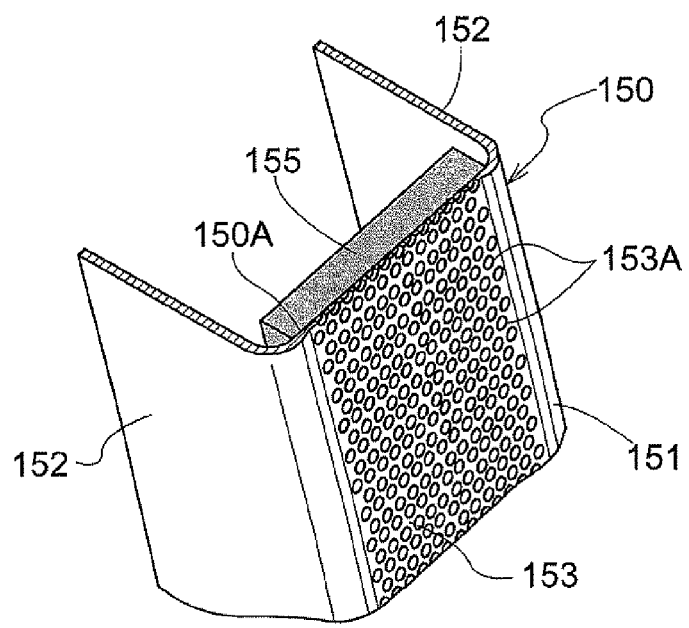
FIG. 23 is a perspective view showing the detailed structure of the openings portion.
Figure 24:
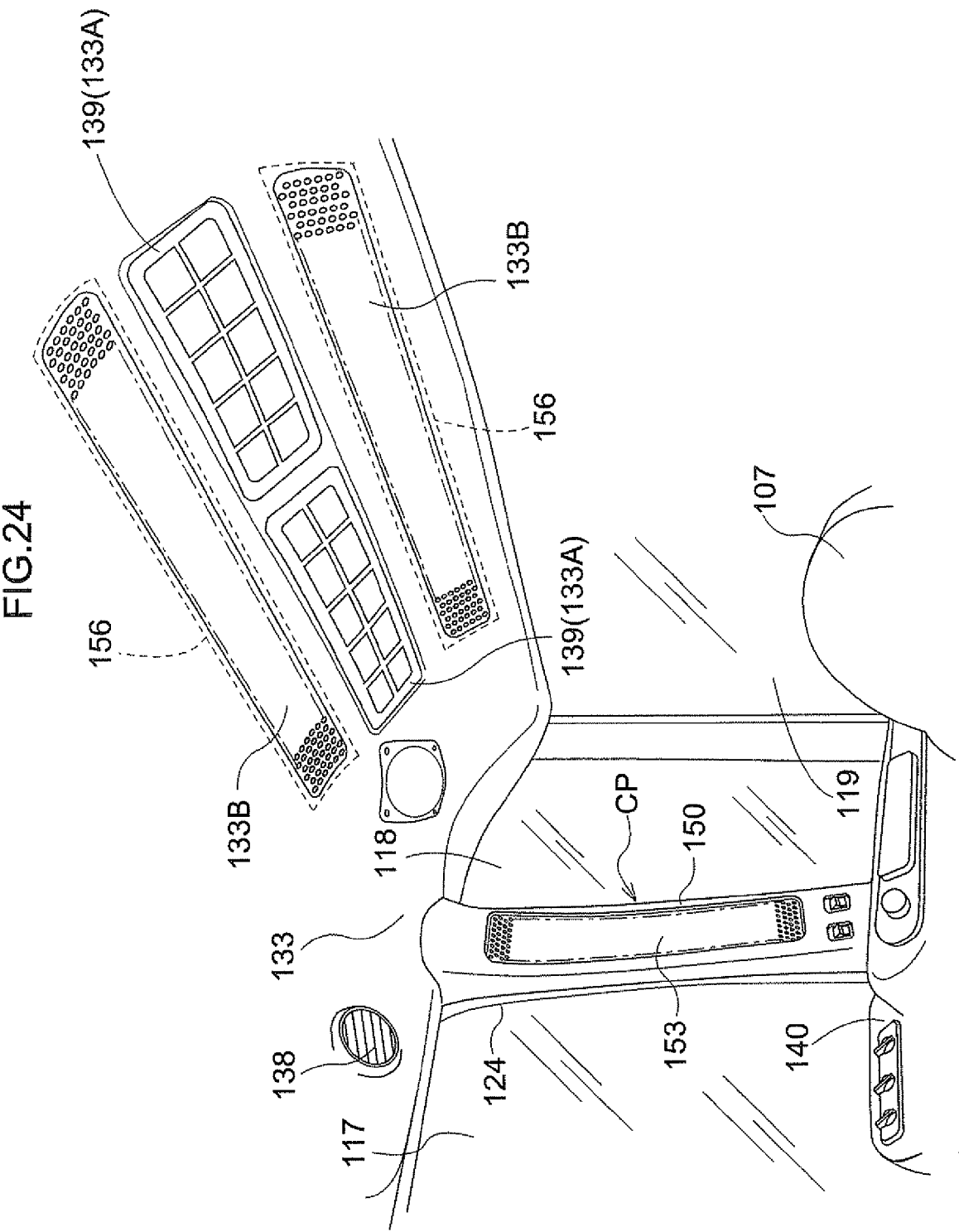
FIG. 24 is a perspective view showing the structure of the inner roof rear part.

The attachment structure of the acoustic absorbent material 155 will be described based on FIGS. 20 through 24. FIG. 21 is a longitudinal sectional front view showing the vicinity of the center pillar CP on the right side, and FIG. 22 is a transverse sectional plan view showing the vicinity of the center pillar CP. FIG. 23 is a detailed view showing the openings portion 153 of the pillar cover 150, and FIG. 24 is a perspective view showing the rear part of the inner roof 133 as viewed from the operating seat 107. In FIGS. 20 through 23, the acoustic absorbent material 155 affixed to the pillar cover 150 on the right side of the operating seat 107 is described as an example, but other aspects of the acoustic absorbent material 155 affixed to the pillar cover 150 on the left side of the operating seat 107 are the same except for the difference in the left-right direction.

As shown in FIGS. 20 through 23, the center pillars CP are provided with a center pillar main body 124 and a pillar cover 150. The center pillar main body 124 is formed so as to have a bracket-shaped transverse sectional shape that opens toward the inside (towards the operating seat 107), and cover attachment holes 124a are formed in a plurality of locations on the front surface and the back surface of the center pillar main body 124.

The pillar covers 150 of the center pillars COP are made of resin and formed so as to have a bracket-shaped transverse sectional shape that opens toward the outside. The covers are formed by integrally forming a main body panel 151 on the side of the operating seat 107 and front and rear side panels 152, 152, which are folded to the outside from the front end and rear end of the main body panel 151.

The pillar cover 150 is molded to a round curved shape in which the center part of the main body panel 151 in the vertical direction curves in towards the outside with a constant curvature as viewed from the front, and noise near the ears of the operator seated in the operating seat 107 can be efficiently absorbed by the acoustic absorbent material 155 affixed to the inner surface 150A of the curved main body panel 151. The upper part and the lower part of the pillar cover 150 are molded in shapes that conform to the shapes of the inner roof 133 and the operating box 140 at the bottom of the pillar cover 150, so as to create an attractive appearance as viewed from the operating seat 107.

An openings portion 153 that curves slightly inward towards the outside in a vertically elongated rectangle shape as viewed from the inside is integrally molded from the upper part to the lower part in the main body panel 151 of the pillar cover 150. A plurality of round hole openings 153S is formed at equal intervals in the openings portion 153, and vertically adjacent openings 153S are arranged in a staggered state in the horizontal direction so that the area (open area) occupied by the openings 153A in the openings portion 153 can be kept large. All of the openings 153A are preferably formed so as to have the same size, but some of the openings 153A may be formed in a different size than other openings 153A. Each of the openings 153A preferably has a diameter of 1 cm or less, and a diameter of 0.5 cm or less is more preferred.

Forming the openings portion 153 in which the openings 153A are provided in the pillar cover 150 in this manner makes it possible to maintain a large open area of the openings portion 153 and to enhance the sound-absorbing effects of the acoustic absorbent material 155, as well as to form the openings portion 153 without compromising aesthetics.

Forming the openings portion 153 in the pillar cover 150 makes it easy for noise at the operating seat 107 to be transmitted to the acoustic absorbent material 155 affixed to the inner surface 150A of the pillar cover 150, and for sound to be absorbed into the acoustic absorbent material 155. As a result, noise at the operating seat 107 can be efficiently absorbed by the acoustic absorbent material 155 in comparison with a case in which the acoustic absorbent material 155 is affixed to the inner surface of a cover or the like (not shown) that is not provided with the openings portion 153, for example.

Outwardly recessed front-rear indentations 151A, 51A are formed in the lower part of the main body panel 151 of the pillar cover 150, and work lamp operating switches 145B, 145B for switching the work lamps 109 disposed in the upper rear part of the cabin 108 are provided in the indentations 151A, 51A.

Attachment holes are formed in a plurality of locations of the front and rear side panels 152, 152 of the pillar cover 150. Fixtures 154 are mounted in the attachment holes of the pillar cover 150, and when the pillar cover 150 is fitted in accordance with the positions of the cover attachment holes 124a of the center pillar main body 124, and the fixtures 154 of the pillar cover 150 are pushed in towards the center pillar main body 124, the distal ends of the fixtures 154 engage with the cover attachment holes 124a, and the pillar cover 150 can be fixed to the center pillar main body 124. When the fixtures 154 of the pillar cover 150 are pulled to the front or the rear, the engagement of the distal ends of the fixtures 154 with the cover attachment holes 124a is released, and the pillar cover 150 can be easily and rapidly removed from the center pillar main body 124.

A band-shaped acoustic absorbent material 155 that is elongated in the vertical direction is affixed to the inner surface 150A of the main body panel 151 of the pillar cover 150. The surface area of the acoustic absorbent material 155 is set so as to be larger than the surface area of the openings portion 153 of the pillar cover 150, the acoustic absorbent material 155 is configured so as to be able to cover the entire area of the openings portion 153 of the pillar cover 150, and the external peripheral part of the acoustic absorbent material 155 is affixed to the inner surface 150A of the pillar cover 150. The acoustic absorbent material 155 is preferably affixed using a publicly known adhesive, but may also be attached by another publicly known method such as bolts, nuts, or the like. Adopting a configuration in which the external peripheral part of the acoustic absorbent material 155 is affixed to the inner surface 150S of the pillar cover 150 to fix the acoustic absorbent material 155 makes it possible to prevent the placement of an adhesive or the like between the acoustic absorbent material 155 and the inner surface 150S of the pillar cover 150, for example, from adversely affecting the transmission of noise inside the cabin 108 to the acoustic absorbent material 155.

The acoustic absorbent material 155 is composed of a spongiform foam material made of a polyethylene-based material, and is configured so that sound is absorbed and diffused into the acoustic absorbent material 155, which is a porous material, whereby a portion of the sound energy can be converted to heat energy, and the sound can be absorbed. Through the absorption of noise inside the cabin 108, the heat energy is released from the openings 153A formed in the openings portion 153 when a portion of the sound energy is converted to heat energy, and the heat energy of the acoustic absorbent material 155 can be efficiently transferred.

As shown in FIG. 19, the center pillars CP are positioned to the left and right of the head of the operator seated in the operating seat 107, and the surface of the acoustic absorbent material 155 is positioned so as to face towards the operating seat 107. The pillar cover 150 provided with the acoustic absorbent material 155 can be positioned near the ears of the operator by thus attaching the pillar cover 150 provided with the acoustic absorbent material 155. As a result, the noise at the operating seat 107 can be effectively absorbed by the acoustic absorbent material 155 provided to the pillar cover 150, and noise that is unpleasant to the ears of the operator can be effectively reduced.

The pillar cover 150 provided with the acoustic absorbent material 155 is mounted to the vertically elongated center pillar main body 124. Not only does this make it possible to effectively reduce noise that is unpleasant to the operator, but debris or dirt in the cabin 108 also does not easily accumulate on the surface of the acoustic absorbent material 155. As a result, the sound-absorbing effects of the acoustic absorbent material 155 can be sustained.

As shown in FIG. 22, a space is formed by the center pillar main body 124 and the pillar cover 150 in the state in which the pillar cover 150 is mounted to the center pillar main body 124, and the thickness and other characteristics of the acoustic absorbent material 155 are set so that a prescribed space can be maintained to the outside of the acoustic absorbent material 155. As a result, the amplitude of the sound absorbed by the acoustic absorbent material 155 via the openings portion 153 of the pillar cover 150 is further reduced by the sound-wave-expanding effects that occur when sound waves enter the space, and the noise at the operating seat 107 can be even more efficiently reduced. The heat energy of the acoustic absorbent material 155 can be efficiently dissipated by the space maintained to the outside of the acoustic absorbent material 155.

As shown in FIG. 24, a pair of left and right inside air supply vents 133A in the shape of transverse elongated rectangles is formed in the center of the rear part of the inner roof 133, a resin mesh ventilation cover 139 is mounted to the inside air supply vents 133A, and the air inside the cabin 108 can be fed from the inside air supply vents 133A to the ventilation unit 135.

Upper and lower openings portions 133B, 133B are formed in the inner roof 133 and are positioned above and below the inside air supply vents 133A. An acoustic absorbent material 156 for covering substantially the entire area of the openings portions 133B is affixed to the inner surfaces (towards the ventilation unit 135) of the openings portions 133B, and the acoustic absorbent material 156 has the same openings formed therein as those of the openings portion 153 of the abovementioned pillar cover 150.

Forming the openings portions 133B in the inner roof 133 in positions near the inside air supply vents 133A in this manner makes it possible to maintain a large open area for the openings portions 133B and to enhance the sound-absorbing effects of the acoustic absorbent material 156, as well as to form the openings portions 133B without compromising aesthetics.

The acoustic absorbent materials 156 provided to the inner roof 133 are positioned at an angle above and to the rear of the head of the operator seated in the operating seat 107, and the acoustic absorbent materials 156 are arranged so that the surfaces thereof face towards the operating seat 107. Attaching the acoustic absorbent materials 156 to the rear part of the inner roof 133 in this manner makes it possible to position the acoustic absorbent materials 156 provided to the inner roof 133 near the ears of the operator. As a result, the noise at the operating seat 107 can be effectively absorbed by the acoustic absorbent materials 156 provided to the inner roof 133, and noise that is uncomfortable to the operator can be effectively reduced.

Providing the acoustic absorbent materials 156 to the inner roof 133 not only makes it possible to effectively reduce noise that is unpleasant to the operator, but debris or dirt in the cabin 108 also does not easily accumulate on the surfaces of the acoustic absorbent materials 156. As a result, the sound-absorbing effects of the acoustic absorbent materials 156 can be sustained.

[Effects of Attaching the Acoustic Absorbent Material]

Figure 25:
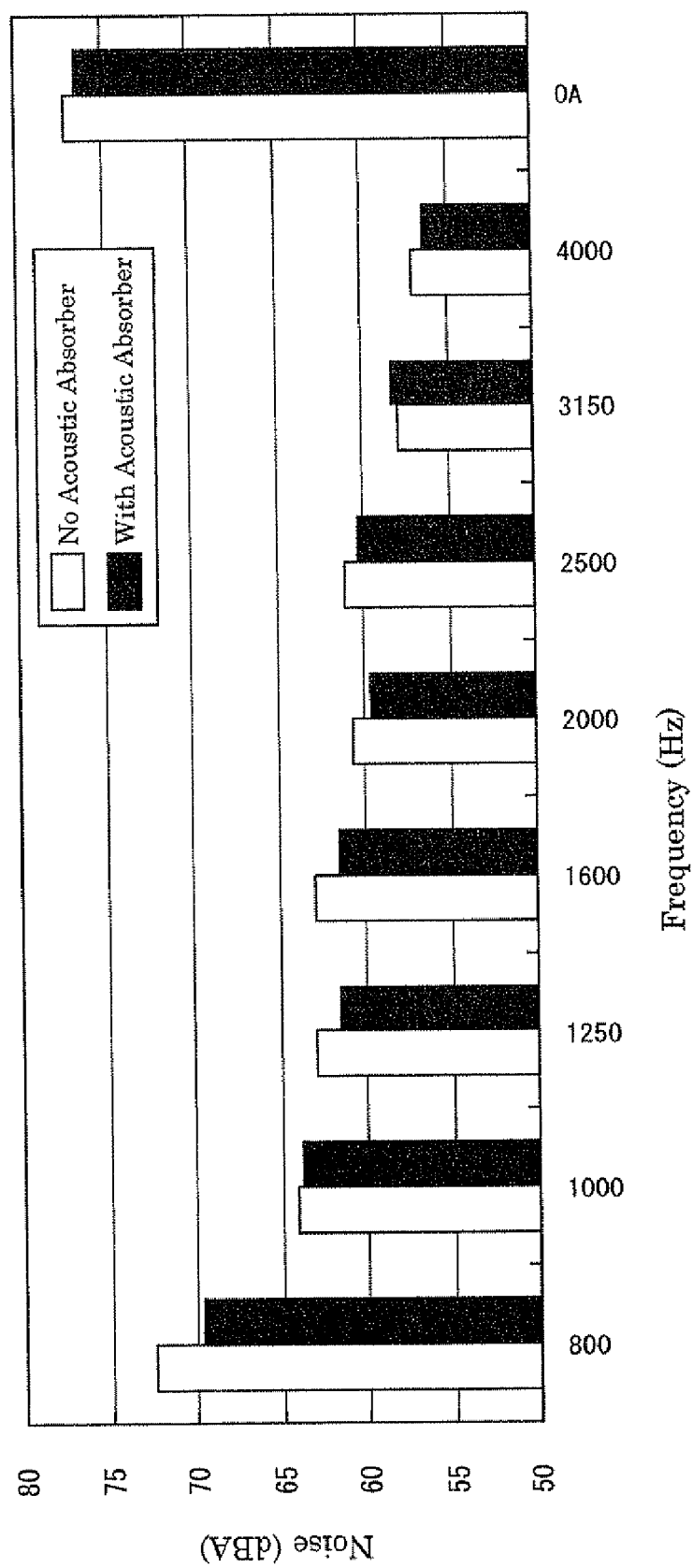
FIG. 25 is a graph showing an example of the results of measuring the noise for each frequency.

The results of measuring the noise near the ears of an operator seated in the operating seat 107 of the cabin 108 in which the acoustic absorbent materials 155, 156 are attached will be described based on FIGS. 25, 26, and 29. FIG. 25 is a graph comparing two types of data: data in which the engine 104 was set to full-throttle, and the noise near the ears of the operator of the operating seat 107 was measured by a noise meter (not shown) in a state in which the acoustic absorbent material 155 and the acoustic absorbent material 156 were attached; and data in which the engine 104 was set to full-throttle, and the noise near the ears of the operator of the operating seat 107 was measured by a noise meter in a state in which the acoustic absorbent material 155 and the acoustic absorbent material 156 were not attached.

In FIG. 25, the noise (dBA) for each ⅓ octave band in the A characteristic is indicated in the form of a bar graph for each ⅓ octave band center frequency. "OA value" is an abbreviation for the overall value, and is a value that is computed from the measured value of the noise for each octave band and used for comprehensive evaluation of the noise.

Figures 26, 27:
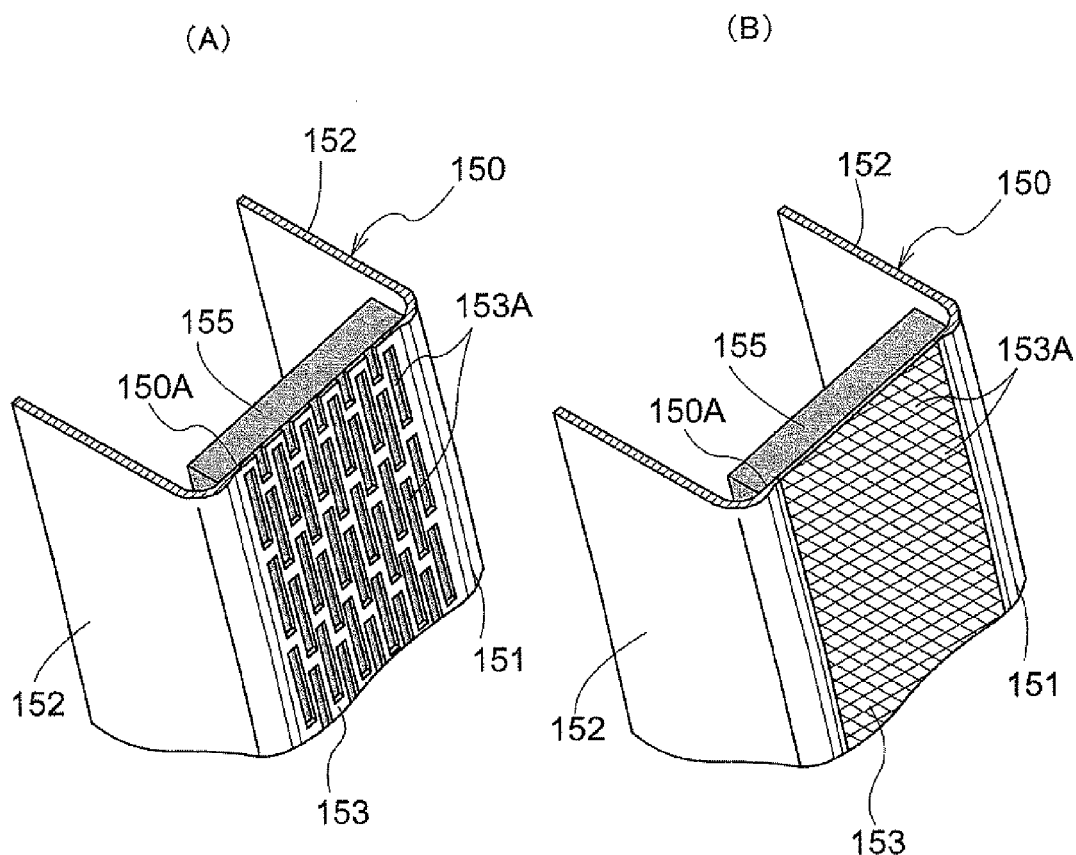
FIG. 26 is a table comparing the results of measuring the noise for each attachment position.
FIG. 27 is a perspective view showing the structure of the openings portion and the acoustic absorbent material in a first modification of the present invention.
Figure 29:
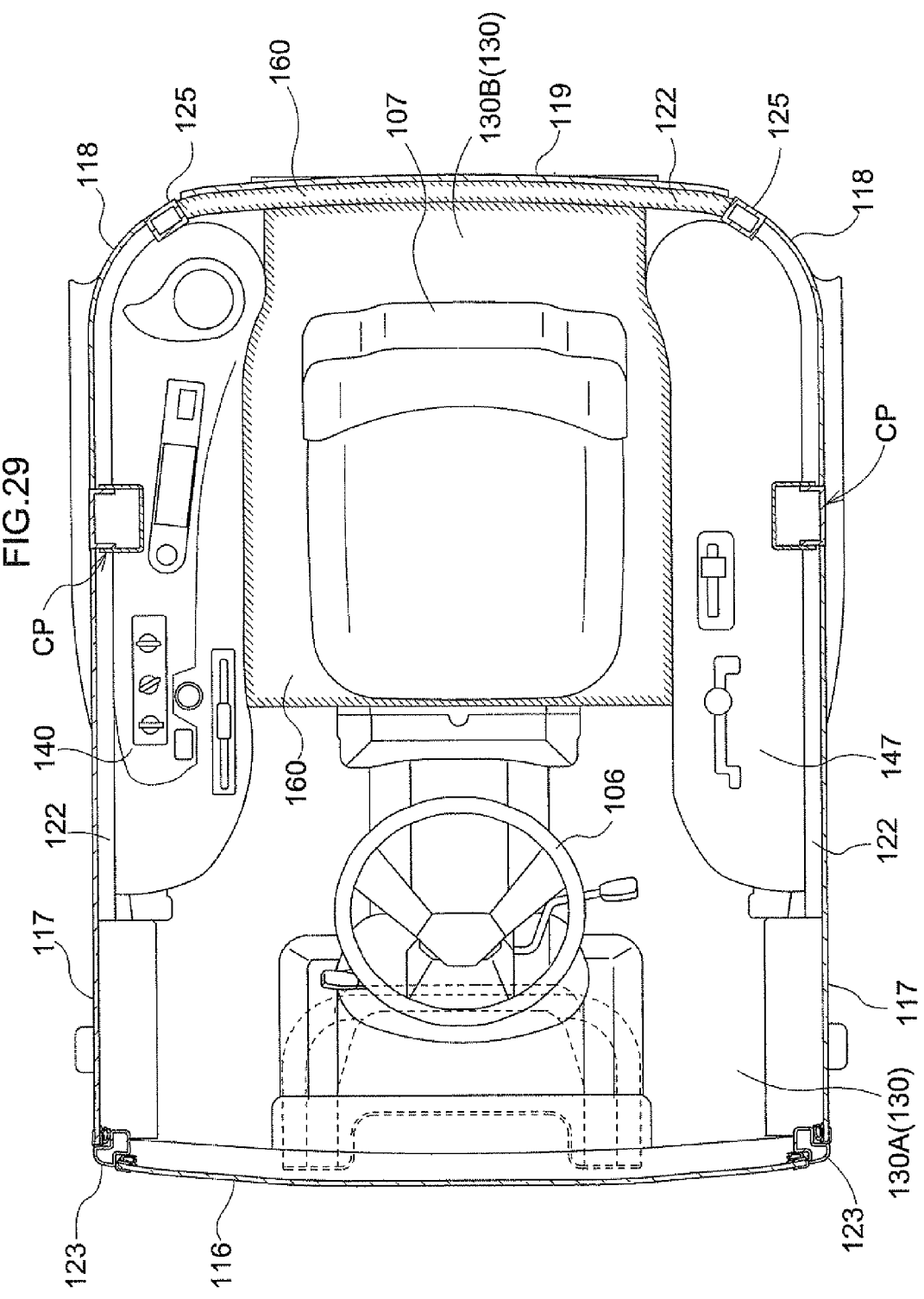
FIG. 29 is a rough plan view of the inside of the cabin when the floor sheet is installed.

FIG. 26 is a table comparing the spectral values and OA values at 800 Hz or higher of the noise in a case in which the acoustic absorbent material 155 is mounted only to the center pillars CP, as well as a case in which the acoustic absorbent material 156 is mounted only to the inner roof 133, a case in which the acoustic absorbent material 155 and the acoustic absorbent material 156 are mounted to the center pillars CP and the inner roof 133, and a case in which the acoustic absorbent material 155 and the acoustic absorbent material 156 are not mounted, and a floor sheet 160 made of the same material as the acoustic absorbent material 155 is mounted to the lower part of the rear glass 119 and the floor surface of the sheet floor panel 130B surrounded by the tilted lines shown in FIG. 29. The measurement data obtained when the floor sheet 160 was mounted to the floor surface of the sheet floor panel 130B and the lower part of the rear glass 119 are shown for comparison, and have no bearing on the effects of the acoustic absorbent material 155 and the acoustic absorbent material 156.

The spectral values of the noise in FIG. 26 were computed from values measured for each octave band when the measurement range of the noise meter was set to 800 to 5000 Hz, and the OA values of the noise in FIGS. 25 and 26 are values computed from values measured for each octave band when the measurement range of the noise meter was set to 0 to 20000 Hz.

As shown in FIG. 25, when the acoustic absorbent material 155 and the acoustic absorbent material 156 were mounted, the noise at a center frequency of 800 Hz was reduced approximately 2.5 dBA, and the OA value was reduced approximately 0.7 dBA in comparison with the case in which the acoustic absorbent material 155 and the acoustic absorbent material 156 were not mounted. As a result, the noise near the ears of the operator seated in the operating seat 107 was reduced.

As shown in FIG. 26, when the acoustic absorbent material 155 was mounted to the center pillars CP, the spectral value of the noise at 800 Hz or higher was reduced 0.5 dBA, and the OA value of the noise near the ears of the operator seated in the operating seat 107 was reduced 0.5 dBA. Accordingly, mounting the acoustic absorbent material 155 to the center pillars CP made it possible to effectively reduce the noise near the ears of the operator seated in the operating seat 107 using a small area of the acoustic absorbent material 155.

Mounting the acoustic absorbent material 155 to the center pillars CP, and mounting the acoustic absorbent material 156 to the inner roof 133 made it possible to reduce the spectral value of the noise at 800 Hz or higher a further 0.2 dBA, and to reduce the noise near the ears of the operator seated in the operating seat 107 a further 0.2 dBA. Accordingly, mounting the acoustic absorbent material 156 to the inner roof 133 made it possible to effectively further reduce the noise near the ears of the operator seated in the operating seat 107.

Mounting the acoustic absorbent material 155 to the center pillars CP, and mounting the acoustic absorbent material 156 to the inner roof 133 made possible a 0.4 dBA reduction of the spectral value of the noise at 800 Hz or higher, and a 0.4 dBA reduction of the OA value of the noise near the ears of the operator seated in the operating seat 107 in comparison with the case in which the floor sheet 160 was mounted to the floor surface of the sheet floor panel 130B and the lower part of the rear glass 119.

As shown in FIG. 26, it can be confirmed that the spectral values and OA values of the noise were reduced by the same amounts, that there was no difference between the OA values measured without limiting the measurement range and the spectral values measured with a limited measurement range by excluding the effects of solid borne sound of approximately 600 Hz or less transmitted through the cabin 108 by resonance of the floor panel 130 or other effects, and that the noise-reducing effects of the acoustic absorbent materials 155, 156 were demonstrated.

As a result, it was confirmed that the noise near the ears of the operator seated in the operating seat 107 was effectively reduced by the small-area acoustic absorbent material 155 and acoustic absorbent material 156 in comparison with the case such as the one shown in FIG. 29, in which the large-area floor sheet 160 was mounted to the floor surface of the sheet floor panel 130B and the lower part of the rear glass 119.

It was confirmed that when the acoustic absorbent material 155 was mounted to the center pillars COP, the spectral value of the noise at 800 Hz or higher was reduced 0.5 dBA, and the OA value was reduced 0.5 dBA, and the noise near the ears of the operator seated in the operating seat 107 was reduced with particular effectiveness by the small-area acoustic absorbent material 155.

An example was described in the aforementioned embodiment in which round hole openings 153A were formed in the inner roof 133 and the pillar cover 150 of the center pillars CP, but a different shape or structure may be employed for the openings 153A. For example, slit-shaped openings 153A as shown in FIG. 27A may be used, or mesh openings 153A as shown in FIG. 27B may be used.

Figure 28:
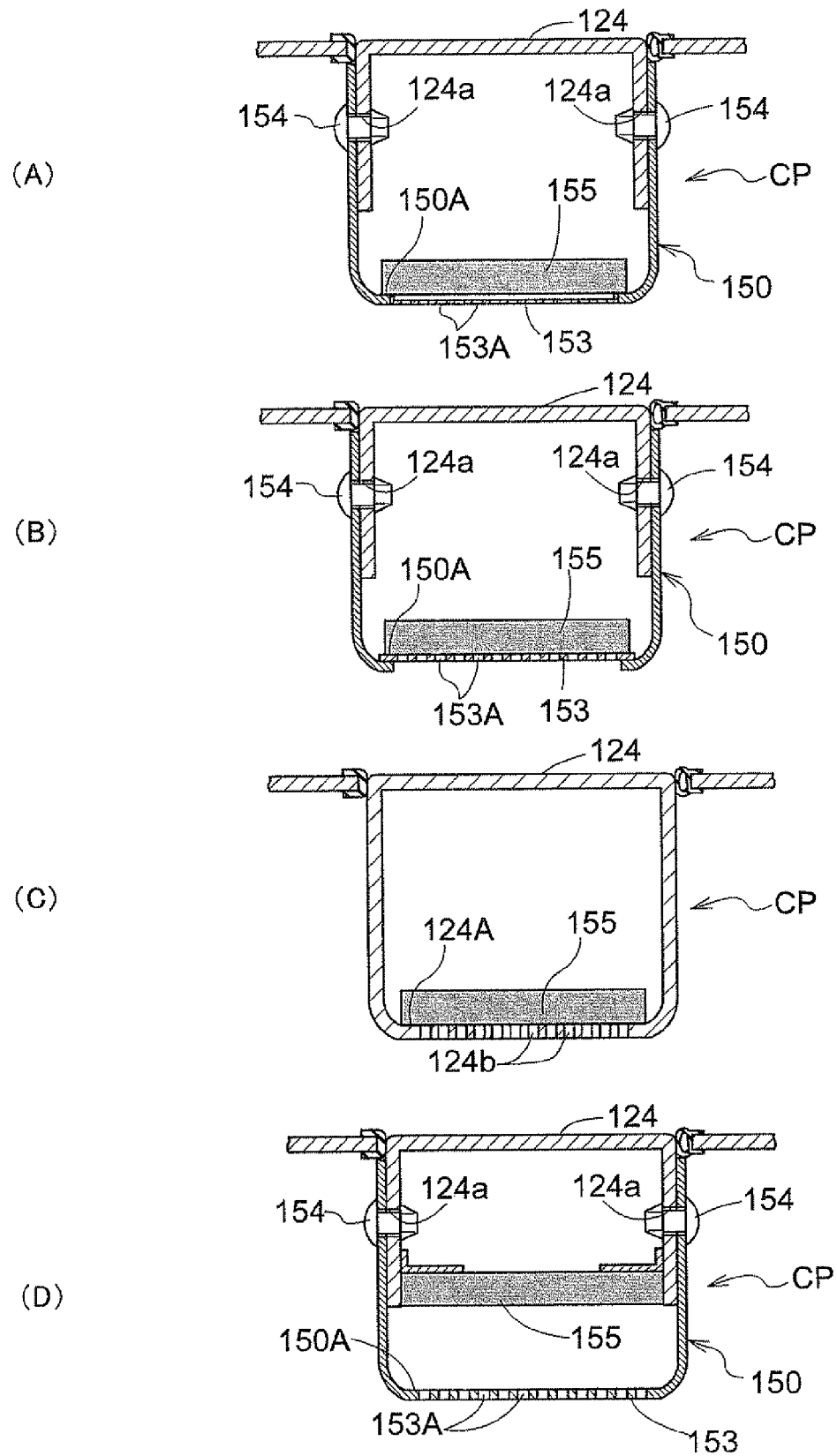
FIG. 28 is a transverse sectional plan view showing the structure of the openings portion and the acoustic absorbent material in a first modification of the present invention.

An example was described in the aforementioned embodiment in which the openings portion 153 was integrally molded in the inner roof 133 and the pillar cover 150 of the center pillars CP. However, for example, a configuration may be adopted in which an openings portion 153 fabricated as a separate part is mounted to the pillar cover 150 as shown in FIG. 28A, or a configuration may be adopted in which a openings portion 153 fabricated as a separate part is mounted to the pillar cover 150, and the acoustic absorbent material 155 is mounted to the inner surface 150A (inner surface of the openings portion 153) of the pillar cover 150, as shown in FIG. 28B.

An example was described in the aforementioned embodiment in which the openings portion 153 was formed, and the acoustic absorbent material 155 was mounted in the pillar cover 150 of the center pillars CP. However, for example, a configuration may be adopted in which the pillar cover 150 is not provided, direct hole opening or another process is performed on the center pillar main body 124 composed of angled pipe to form openings 124b, and the center pillars CP are formed so that the acoustic absorbent material 155 is mounted to the inner surface 124A, as shown in FIG. 28C.

An example was described in the aforementioned embodiment in which the acoustic absorbent material 155 was affixed to the inner surface 150A of the pillar cover 150. However, for example, the acoustic absorbent material 155 may be mounted in a position that is spaced a certain interval apart from the inner surface 150A of the pillar cover 150 as shown in FIG. 28D, and the sound-absorbing effects of the acoustic absorbent material 155 can be further enhanced by forming the space between the inner surface 150A and the acoustic absorbent material 155. The method for mounting the acoustic absorbent material 155 to the inner surface 150A of the pillar cover 150 is not limited to affixing, and a different mounting method may be used. For example, a method may be employed for screw fastening using a pressure plate or the like (not shown).

An example was described in the aforementioned embodiment in which the openings portion 153 was formed, and the acoustic absorbent material 155 was mounted in the pillar cover 150 of the center pillars CP, but the openings portion 153 may be formed and the acoustic absorbent material 155 mounted in a different pillar. For example, an openings portion (not shown) may be formed and an acoustic absorbent material (not shown) mounted in the front pillars 123 or the rear pillars 125.

An example was described in the aforementioned embodiment in which the openings portion 153 was formed, and the acoustic absorbent materials 155, 156 mounted in the inner roof 133 and the pillar cover 150 of the center pillars CP, but an openings portion may be formed and an acoustic absorbent material mounted in an interior surface other than the center pillars CP and the inner roof 133. For example, an openings portion (not shown) may be formed and an acoustic absorbent material (not shown) mounted in the operating box 140, the protective cover 147, the center cover 148, the handle cover 149, and other components. A configuration may also be adopted in which a cover (not shown) besides that of the operating box 140 and other existing interior parts is provided to the dead space inside the cabin 108 (e.g., the portion of the sheet floor panel 130B around the operating seat 107), an openings portion is formed in the cover, and an acoustic absorbent material is mounted to the inner surface of the openings portion. Through such a configuration, noise inside the cabin 108 can be reduced while effectively utilizing the dead space inside the cabin 108 and not making modifications to the existing interior parts.

An example was described in the aforementioned embodiment in which the openings portion 153 was formed and the acoustic absorbent material 156 mounted in the rear part of the inner roof 133, but the openings portion 153 may be formed and the acoustic absorbent material 156 mounted in a different position of the inner roof 133. For example, forming an openings portion 153 on the left and right sides of the center part in the front-rear direction of the inner roof 133 and mounting the acoustic absorbent material 156 makes it possible to efficiently reduce the noise to the left and right above the ears of the operator seated in the operating seat 107.

An example was described in the aforementioned embodiment in which a spongiform foam material composed of a polyethylene-based material was used as the acoustic absorbent material 155, but an acoustic absorbent material composed of a different material may also be used. For example, an acoustic absorbent material composed of a polyether-based material or a felt-based material, or a urethane or other acoustic absorbent material (not shown) may be used.

A tractor was described as an example of a vehicle with a cabin in the present specification, but the present invention may be applied in the same manner to a different vehicle insofar as the vehicle has a cabin. For example, the present invention may be applied in the same manner to a combine or other agricultural work vehicle, a civil engineering work vehicle, a construction work vehicle, a passenger vehicle, or a truck or other commercial vehicle.

What is claimed is:

1. A vehicle with a cabin, comprising:
   a vehicle body supported by a plurality of wheels;
   a front cabin bracket supported by the vehicle body;
   an elastic member for supporting the cabin, disposed between the cabin and the cabin bracket; and
   a weight member attached to a floor panel of the cabin.

2. The vehicle with a cabin according to claim 1, wherein the weight member is attached to the floor panel of the cabin by a bolt via a rubber isolator.

3. The vehicle with a cabin according to claim 2, wherein a cylindrical member that is in contact with the plate-shaped member is provided between the weight member and the bolt.

4. The vehicle with a cabin according to claim 1, wherein the weight member is attached to the floor panel of the cabin at an attachment point and the attachment point is set so that a peak of a vibration acceleration as a function of frequency is moved from a higher frequency to a lower frequency.

* * * * *